United States Patent [19] [11] 4,149,521
Miller et al. [45] Apr. 17, 1979

[54] SOLAR ENERGY COLLECTION SYSTEM
[76] Inventors: James C. Fletcher, Administrator of the National Aeronautics and Space Administration with respect to an invention of Charles G. Miller, Pasadena; James B. Stephens, La Crescenta, both of Calif.
[21] Appl. No.: 762,362
[22] Filed: Jan. 25, 1977

Related U.S. Application Data
[62] Division of Ser. No. 598,969, Jul. 24, 1975, Pat. No. 4,065,053.
[51] Int. Cl.² ............................................. F24J 3/02
[52] U.S. Cl. ................................. 126/271; 237/1 A; 350/288; 350/299; 126/400
[58] Field of Search .................... 126/270, 271, 400; 237/1 A, 65; 350/288, 293, 294, 295, 299, 310, 320, 199; 248/278, 281, 284

[56] References Cited
U.S. PATENT DOCUMENTS

| | | | |
|---|---|---|---|
| 1,047,554 | 12/1912 | Nichols | 126/271 |
| 1,271,800 | 7/1918 | Sutton | 126/270 X |
| 1,661,473 | 3/1928 | Goddard et al. | 126/271 |
| 2,960,272 | 11/1960 | Saunders | 237/65 |
| 3,118,437 | 1/1964 | Hunt | 126/270 |
| 3,134,906 | 5/1964 | Henker | 126/270 |
| 3,229,682 | 1/1966 | Perlmutter et al. | 126/270 |
| 3,243,117 | 3/1966 | Morgan | 126/270 X |
| 3,868,823 | 3/1975 | Russell, Jr. et al. | 126/270 |
| 3,869,199 | 3/1975 | Cummings | 126/270 |
| 3,957,029 | 5/1976 | Nozik | 126/271 |
| 3,972,600 | 8/1976 | Cobarg | 350/295 |
| 3,973,748 | 8/1976 | Nagasaka | 248/281 |
| 3,985,116 | 10/1976 | Kapany | 126/271 |
| 3,994,435 | 11/1976 | Barr | 126/271 |
| 4,010,614 | 3/1977 | Arthur | 126/270 |
| 4,010,732 | 3/1977 | Sawata | 126/271 |
| 4,033,324 | 7/1977 | Eckels | 126/270 |
| 4,040,410 | 8/1977 | Libowitz | 126/270 |

Primary Examiner—James Yeung
Attorney, Agent, or Firm—Monte F. Mott; John R. Manning; Wilfred Grifka

[57] ABSTRACT

A fixed, linear, ground-based primary reflector having an extended curved sawtooth-contoured surface covered with a metalized polymeric reflecting material, reflects solar energy to a movably supported collector that is kept at the concentrated line focus of the reflector primary. The primary reflector may be constructed by a process utilizing well-known freeway paving machinery. The solar energy absorber is preferably a fluid-transporting pipe. Efficient utilization leading to high temperatures from the reflected solar energy is obtained by cylindrical shaped secondary reflectors that direct off-angle energy to the absorber pipe. To obtain higher temperature levels, refocusing secondary reflectors, that cause a series of discrete spots of highly concentrated solar energy to fall on the fluid-transporting pipe, are utilized. A seriatim arrangement of cylindrical secondary reflector stages and spot-forming reflector stages produces a high temperature solar energy collection system of greater efficiency.

37 Claims, 28 Drawing Figures

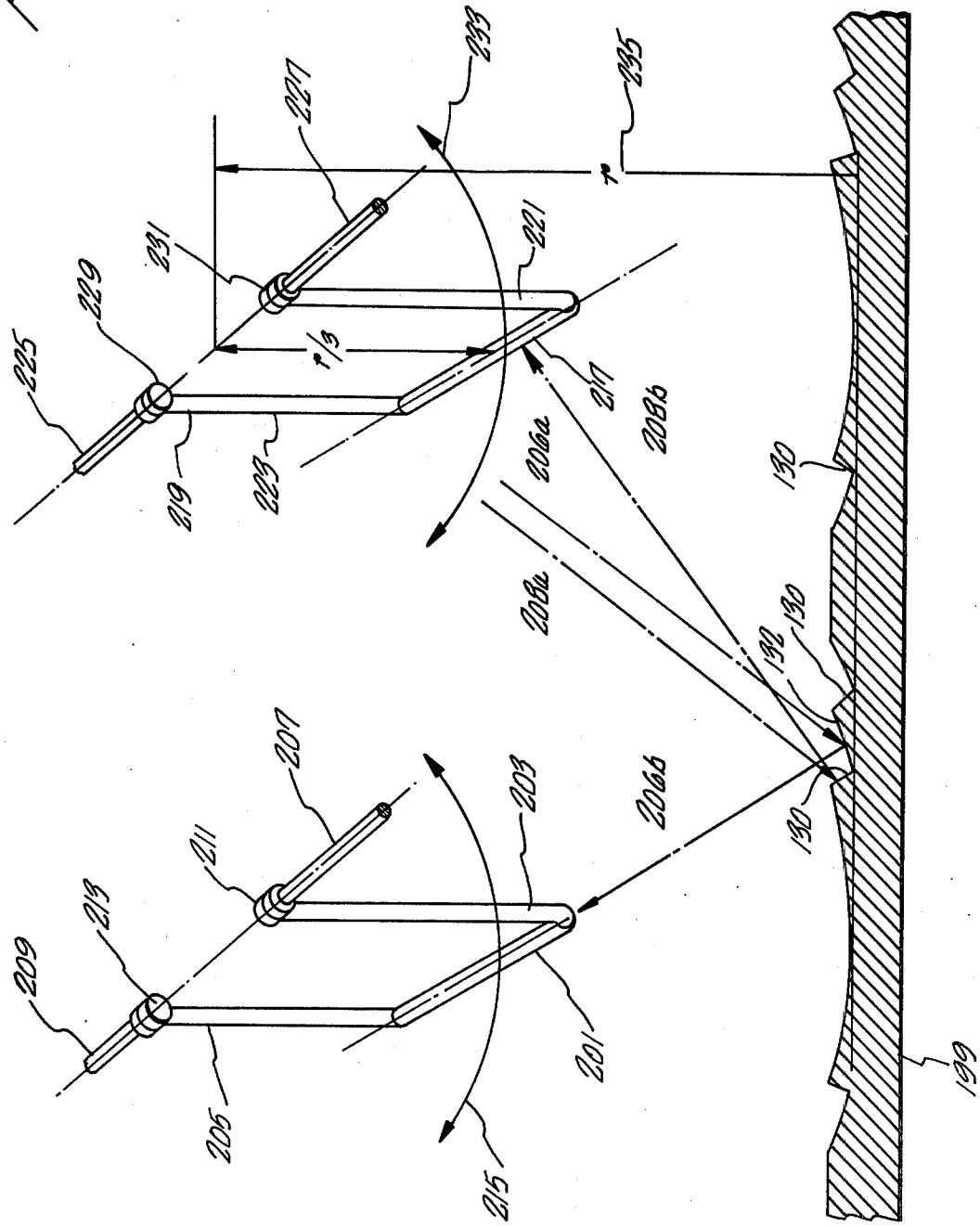

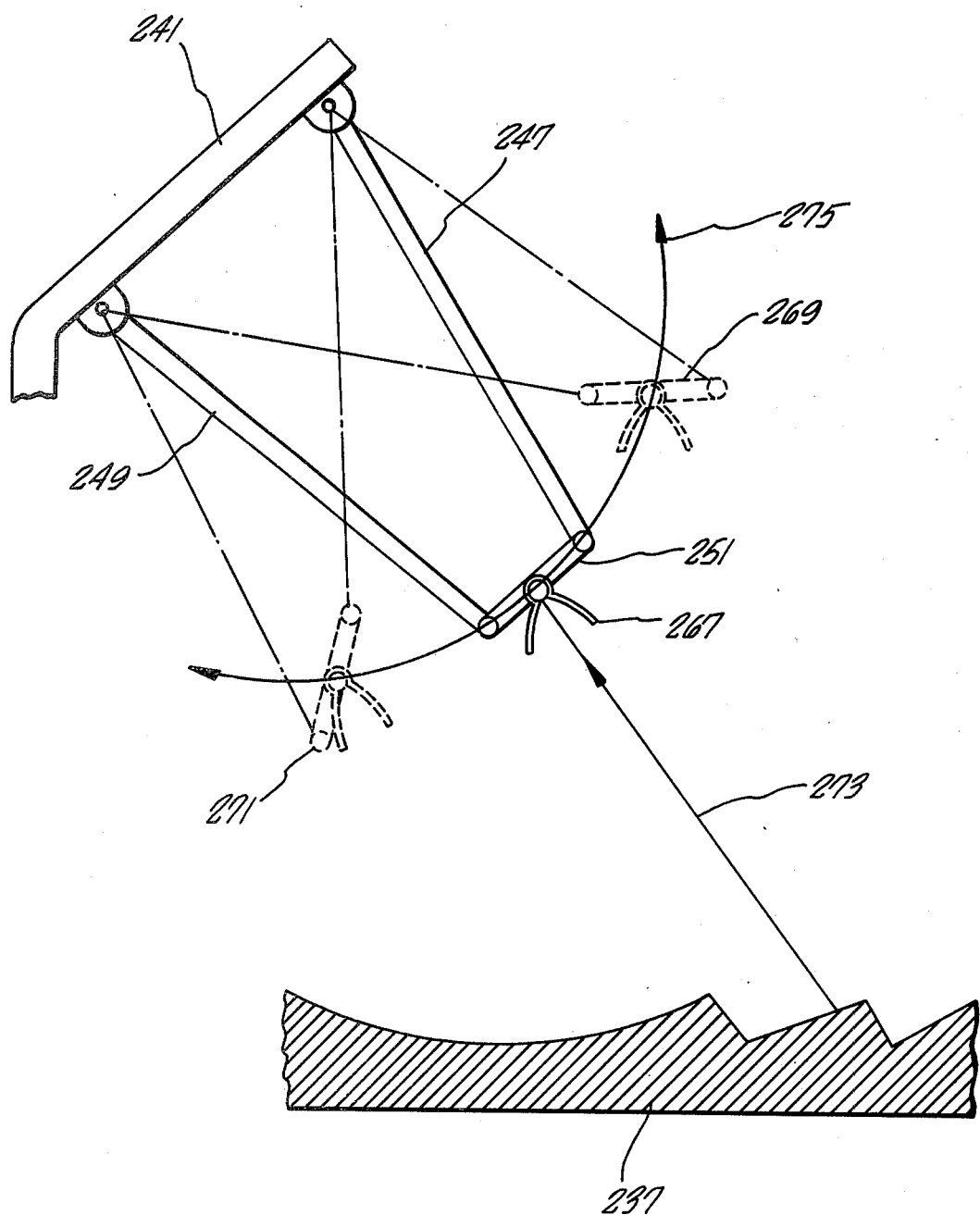

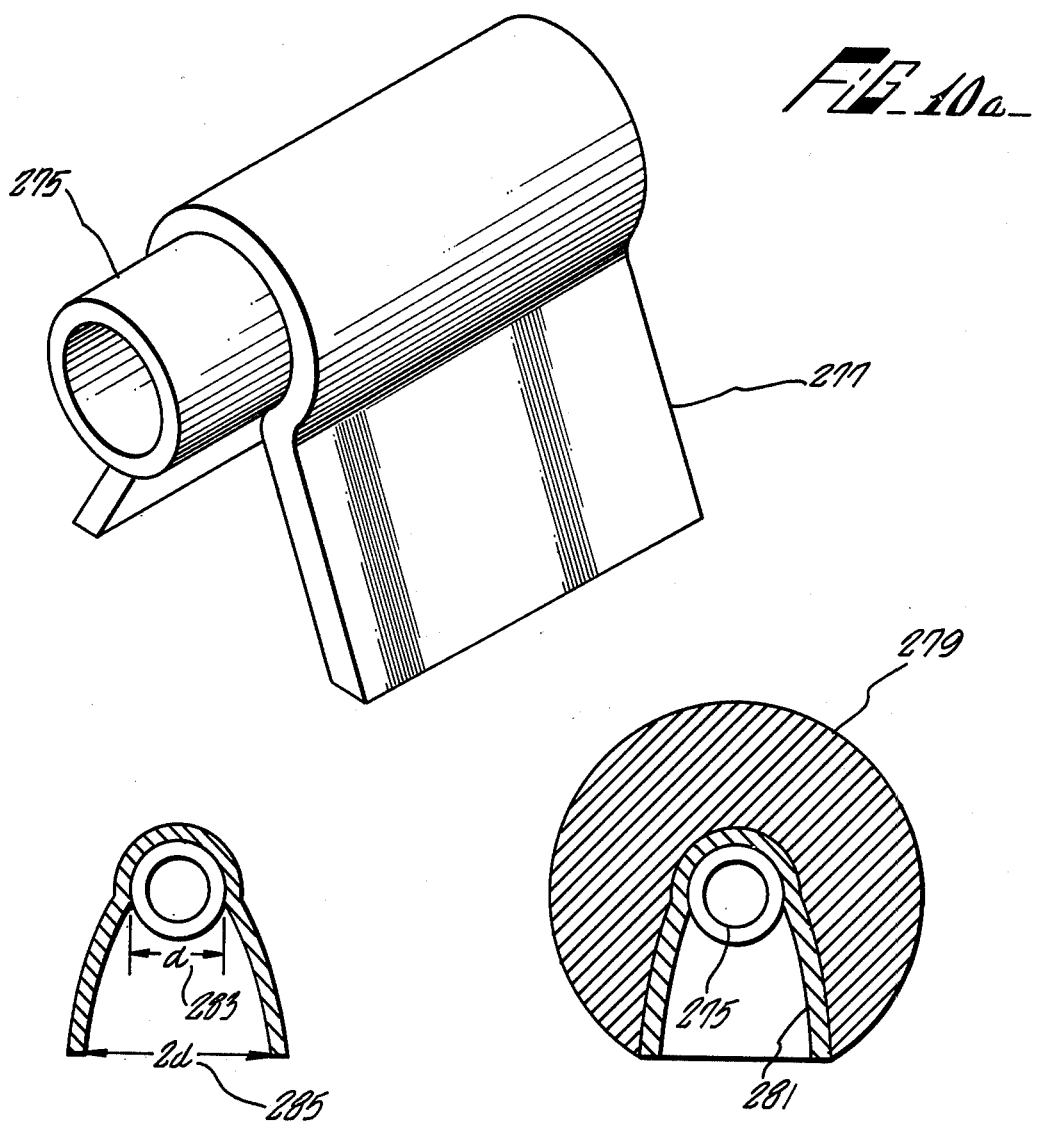
FIG_10a_
FIG_10b_
FIG_10c_
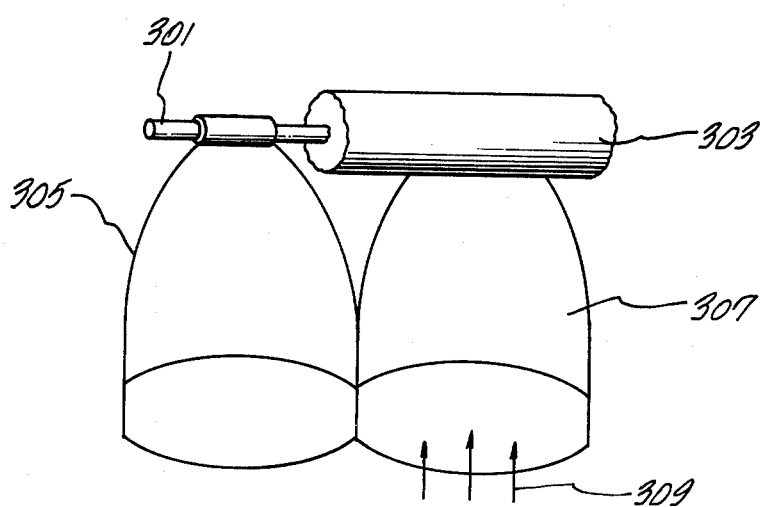
FIG_14_

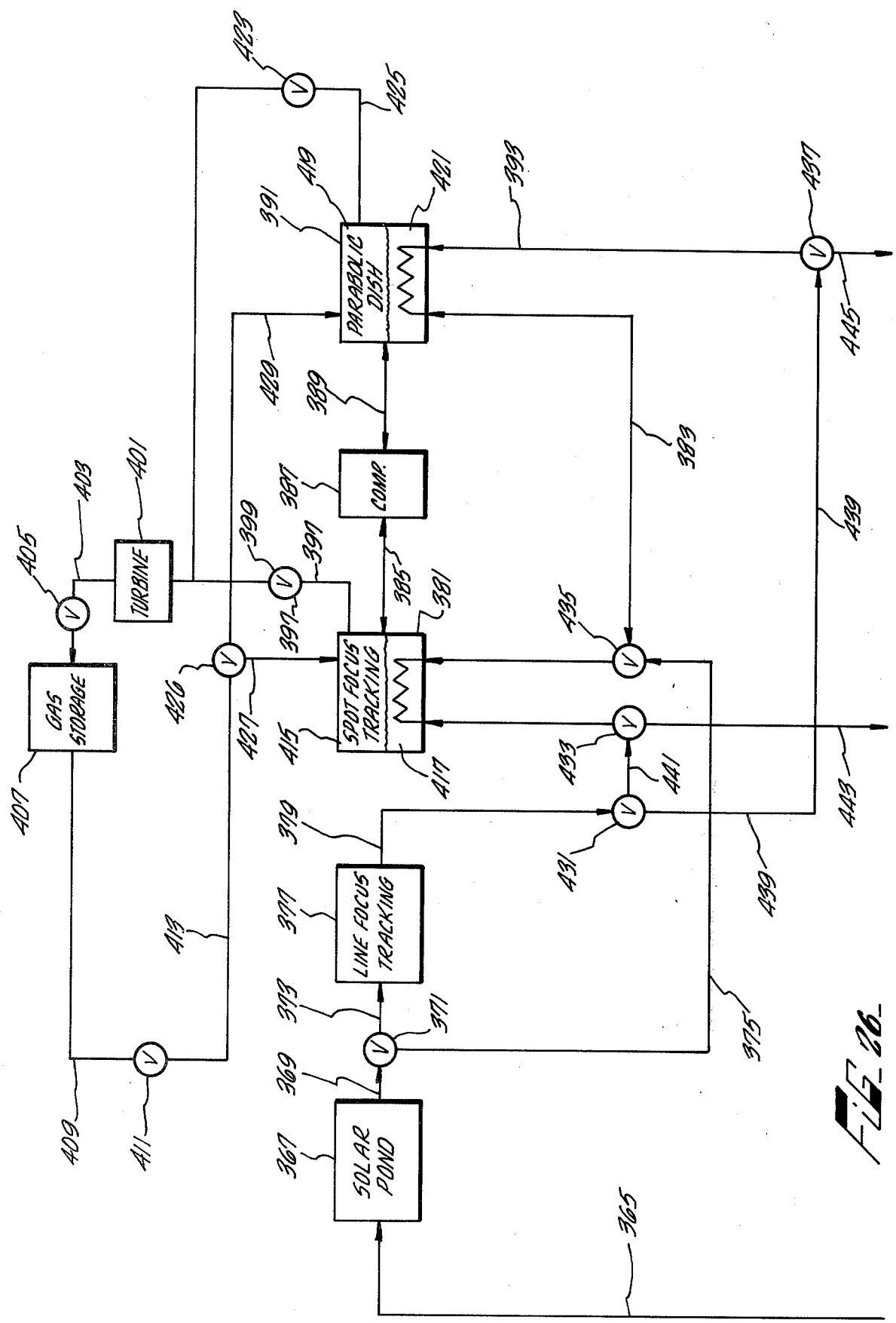

SOLAR ENERGY COLLECTION SYSTEM

ORIGIN OF THE INVENTION

The invention described herein was made in the performance of work under a NASA contract and is subject to the provisions of Sections 305 of the National Aeronautics and Space Act of 1958, Public Law 85-568 (72 Stat. 435; 42 U.S.C. 2457).

CROSS REFERENCE TO RELATED APPLICATIONS

This application is a division of application Ser. No. 598,969 filed July 24, 1975, for "Low Cost Solar Energy Collection System", now U.S. Pat. No. 4,065,053.

BACKGROUND OF THE INVENTION

The present invention relates generally to improvements in solar energy collection systems and more particularly pertains to new and improved sun-tracking solar energy collection systems that are capable of producing high solar energy concentration ratios.

The overriding problem confronting developers of solar energy power systems has been the problem of producing the required high temperatures at a cost that would make the utilization of solar power competitively attractive. Presently, systems capable of producing the required high temperatures directly from solar energy utilize tracking devices with large moving primary reflectors. Accurate tracking devices, however, are expensive to construct and costly to maintain if they are to track under conditions of weather extremes and varying high wind forces. The cost of producing large tracking reflectors and the costs of an associated tracking mechanism sturdy enough to withstand expected wind forces make a solar energy heat generating plant that can provide sufficient power to produce electricity in the multi-megawatt range an uneconomical prospect.

Solar energy collection systems that are to be used for producing superheated steam for use by steam-driven generator equipment for generating electric power must be capable of transforming solar energy into thermal energy in the range of 1000° F. or higher. The prior art systems capable of such heat generation involve tracking concentrators such as three-dimensional paraboloidal dishes which can be precisely steered in both altitude and azimuth to follow the sun's movement. In order to generate temperatures in the range of 1000° F. in sufficient quantity for use as energy for the generation of electrical power, literally thousands of 20-foot diameter, three-dimensional parabolic dishes must be utilized. The cost of producing large numbers of such optically finished compound curve reflecting surfaces that are sturdy enough to hold their figure when tilted and turned in the wind is prohibitive.

OBJECTS AND SUMMARY OF THE INVENTION

An object of this invention is to provide an inexpensive, high temperature solar energy collection system.

Another object of this invention is to provide a tracking solar energy collection system utilizing a fixed, linear, ground-based primary reflector and a movable supported collector.

A further object of this invention is to provide secondary reflectors for refocusing the solar energy reflected from a fixed concentrator into concentrated beams of solar energy.

Yet another object of this invention is to provide secondary reflectors that substantially increase absorption of visible light and reduce emission of heat rays from the collector.

Still a further object of this invention is to provide a large-scale solar power system that is sufficiently efficient and cost effective to be competitively attractive.

These objects and the general purpose of this invention are accomplished in the following manner. A large fixed primary reflector is constructed at ground level by slip-forming in concrete or stabilized dirt a trough with a segmented one-dimensional circular cross-section profile. This profile is covered with an inexpensive light-reflective material. The axis of the primary reflector is optimally aligned with respect to the sun path in the area. A heat-absorbing structure is movably supported above the primary reflector. The support mechanism transversely shifts the heat-absorbing structure to track the changing position of the sun's image diurnally and seasonally, keeping the structure at the changing line focus of the primary reflector. The heat-absorbing structure carries secondary reflectors that either direct off-angle solar energy to the structure or refocus the line focus of the primary reflector into discrete spots of intense solar energy. These secondary reflectors are constructed so as to maximize absorption and minimize heat emission from the heat-absorbing structure. Building the solar energy collection system in stages, each stage designed for optimum efficiency within a certain temperature range, provides a more efficient and cost-effective overall system.

BRIEF DESCRIPTION OF THE DRAWINGS

Other objects and many of the attendant advantages of this invention will be readily appreciated as the same becomes better understood by reference to the following detailed description when considered in conjunction with the accompanying drawings in which like-reference numerals designate like parts throughout the figures thereof and wherein:

FIG. 7 is a partial perspective illustration of a type of laterally movable collector system and a cross section of the large-scale reflector of the present invention;

FIG. 9 is a schematic illustration of the operation of the laterally movable supporting structure of FIG. 8;

FIG. 10A is a perspective illustration of a secondary reflector of the present invention;

FIG. 10B and 10C are cross-sectional illustrations of other embodiments of the secondary reflectors of the present invention;

FIG. 14 is a perspective illustration of an alternate embodiment of a refocusing secondary reflector of the present invention;

FIG. 26 is a block diagram of an alternate embodiment of a staged solar energy collection system utilizing the solar energy collection system of FIG. 3 and its components as illustrated in FIGS. 18, 19, 20, 21, 22, 23, 24, and 25.

DESCRIPTION OF THE PREFERRED EMBODIMENTS

Figure 1:
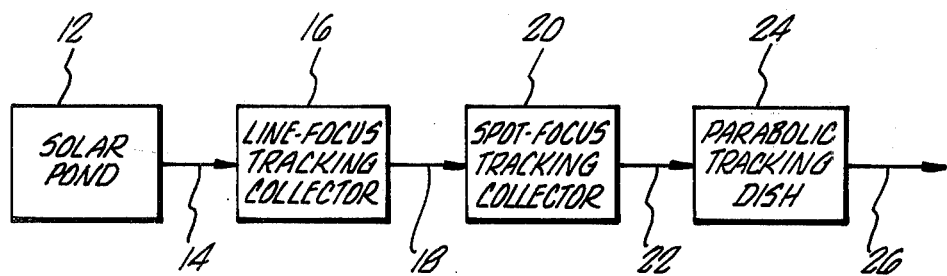
FIG. 1 is a block diagram of a staged solar energy collection system.

A cost-effective solar energy collection system for use with steam driven generator equipment for producing electric power is illustrated in FIG. 1 as consisting of various temperature stages, each temperature stage comprising structure that is most efficient at that temperature range. The first temperature stage 12 of the system is preferably a solar pond. Solar ponds are well known. An example of a superior solar pond can be found in copending patent application U.S. Ser. No. 762,363 filed on Jan. 25, 1977 for Solar Pond by Charles G. Miller and James B. Stephens. The function of the solar pond is to raise the temperature of cold (40°-70° F.) water to a temperature of 200° F. By any well known and convenient means, the 200° F. water is transmitted over interconnect 14 to a line-focus secondary reflector tracking system 16, of the type more fully described herein.

The line-focus secondary reflector tracking system 16 would raise the temperature of the received 200° F. water to approximately 600° F. This 600° F. steam is then supplied, by way of interface 18 to a spot-forming focus secondary reflector tracking system 20, of the type more fully described hereinafter. The spot-forming focus tracking system 20 of the type described herein would raise the temperature of the 600° F. received water to approximately 800° F. The 800° F. fluid may be raised to even higher temperatures by a three-dimensional tracking parabolic dish system 24, such as is well known in the art. The parabolic dish system 24 receives the 800° F. fluid over interface 22 and raises its temperature to approximately 1300° F. This 1300° F. superheated fluid may then be supplied by way of interface 26 to generator equipment for use in the generation of electricity.

Figure 2:
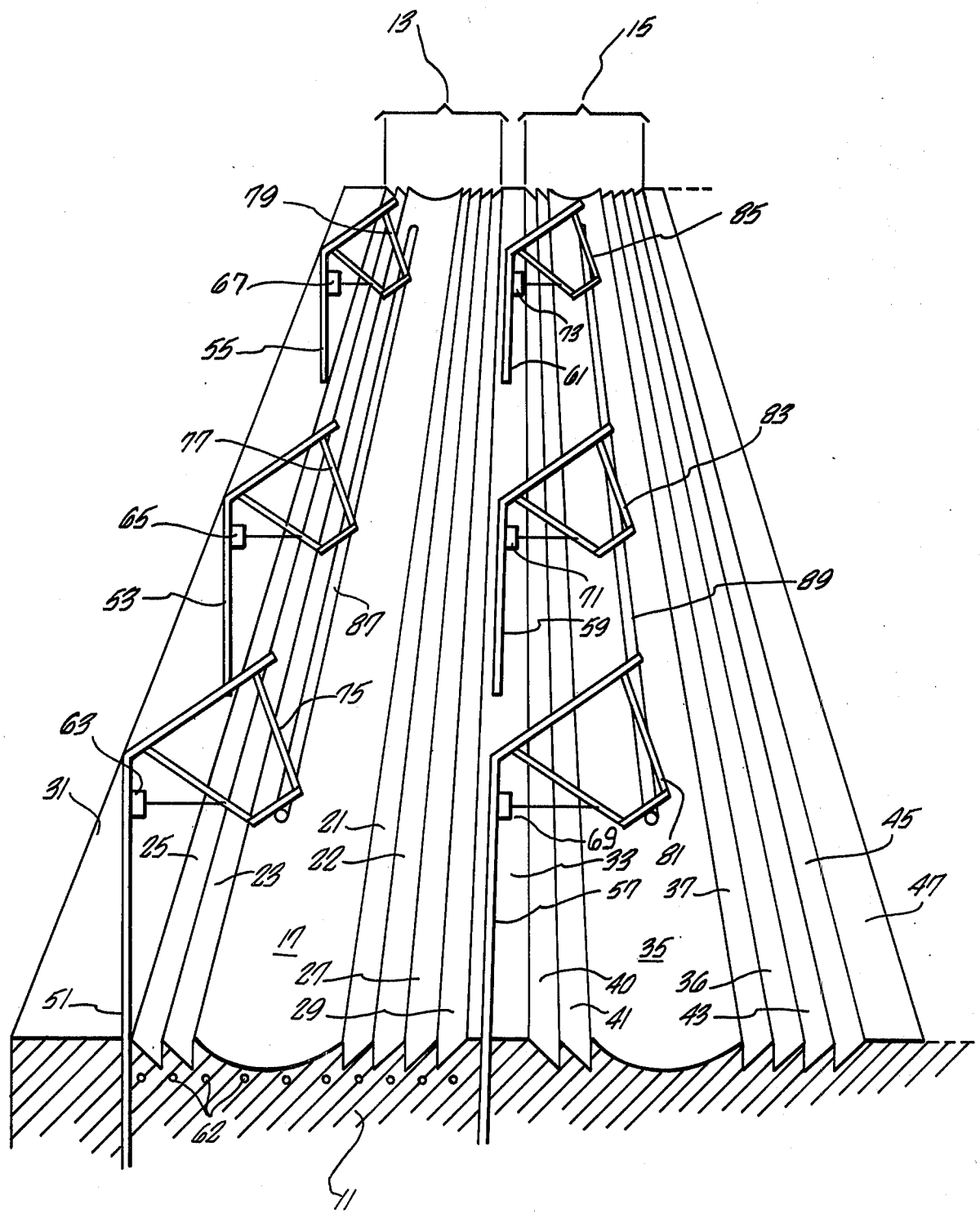
FIG. 2 is a perspective, partial section, illustrating a solar energy collection system according to the present invention.

One embodiment of a tracking solar energy collection system according to the present invention is illustrated in FIG. 2. The ground-based reflector 11 can be made up of a plurality of identical sections 13, 15, each section having its own fluid-carrying vessel 87, 89, respectively, for collecting the solar energy reflected from the respective modular surfaces 13, 15. The width of each modular section is preferably within the capability of present day concrete road laying machinery.

The sawtooth segments 25, 23, 17, 21, 22, 27, and 29 will make up one module 13 that can be laid by a process that utilizes standard highway construction or airstrip construction methods. One example of how the primary reflector modules may be formed follows. A sifter mechanism mounted on wheels having a width equal to or slightly greater than the width of a primary reflector module is utilized. This sifter mechanism may have the following structure. A sifter body is divided into multiple segments, each segment utilizing a rotary screen type mechanism for accepting a different particle size. Conveniently, four segments of the following particle grades may be used: rocks, coarse, medium and fine. The aggregate containing all these grades of particles is supplied to the sifter by a conveyer mechanism, the aggregate being inserted at the "fine" end of the sifter. The entire sifter mechanism moves in a direction whereby its coarse segment is always in the front. Consequently the rocks or very large particles are laid down first, then the coarse particles, then the medium particles, and then the fine particles.

This aggregate material may be the in-situ soil. Or, if the in-situ soil is unsuitable, suitable material may be brought in. As the aggregate is being delivered to the sifter a binder material such as cement is mixed in with it. Consequently all the various graded particles will be associated with the binder. As each graded particulate is ejected from the sifter, it is sprayed with water.

The moistened particulate of each graded layer is partially shaped to the desired contour of the primary reflector by a screed attached to the moving sifting mechanism for each. A plurality of pipes 62 in FIG. 2, having orifices therein, are preferably laid into the multi-layer substrate thus formed in the medium or fine layers.

The multi-layered substrate having binder material throughout is finished to the desired sawtooth segmented cross-section by a roller mechanism that preferably has the following structure. A roller having the inverse curvature of the desired profile and being the width of a primary reflector module travels along the graded aggregate substrate in front of a sled having the same contour as the roller. The sled has mounted thereon acoustic vibrators that operate at high frequency to provide a very smooth surface to the sawtooth segmented primary reflector. The depth of the various segmented steps with varying radii of curvatures 25, 23, 17, 21, 22, 27, and 29 is determined mainly by the slump factor of the thus stabilized soil during its curing process.

An aluminized Mylar sheeting material, 0.00025 inches thick, or equivalent reflective material is laid over the slip-formed profile. The reflecting material is held down by a slight vacuum created at the surface of the reflector profile by drawing a vacuum on the pipes laid therein. Since concrete is a porous substance, drawing a vacuum on the pipes within the concrete will create a low pressure region at the surface of the concrete. This will hold the reflective film material in place without the necessity of glue or some other such fastening means. Holding the reflector covering in place by a vacuum also facilitates rapid replacement of torn or dirty reflector material. A vacuum level, which varies in intensity suitable to the prevailing wind velocity, is preferred. Any suitable method of drawing a vacuum may be utilized. An inexpensive method of producing the vacuum is by steam ejection, using the steam supplied by the system.

Each segmented module of the reflector, such as module 13 has a flat section 31 which can provide access to the curved reflector segments for maintenance and inspection purposes, using a gantry-type vehicle. One type of support structure that may be used comprises a plurality of stanchions 51, 53, 55 equidistantly spaced along a line parallel to the longitudinal axis of each reflector module of the reflector 11. The stanchions 51, 53, 55, for example have a four-bar linkage 75, 77, 79, respectively, attached thereto which supports the fluid-bearing pipe 87. A hydraulic or electrical actuating device of well-known construction 63, 65, 67 is respectively located on the stanchions 51, 53, 55 for moving the four-bar linkages 75, 77, 79 in synchronism. This synchronous movement of the linkage causes the fluid-bearing pipe collector 87 to be transversely shifted in an area relative to the reflecting module 13. The movement of the pipe collector can be controlled either by a programmed source correlated to stored data relating to the apparent sun movement in the area, or alternatively be sun sensing and following systems similar to that used for attitude control on spacecraft.

Every other module of the reflector 11 is similarly constructed. Each module, such as module 15, for example, has a flat walkway portion 33 in which the plurality of stanchions 57, 59 and 61 are placed. These stanchions support respective four-bar linkages 81, 83 and 85. Each bar linkage supports a portion of the fluid-carrying pipe 89 which is moved transversely in an arc by actuation of motive means 69, 71 and 73 respectively connected to the bar linkage devices. The cylindrical segments 40, 41, 35, 37, 36, 43, and 45 of the reflector module 15 may have the same radius of curvature as the segments 25, 23, 17, 21, 22, 27 and 29, respectively of module 13.

These optimum width modules of the reflector surface 11 may be laid side by side, in the manner illustrated in FIG. 2, for any desired distance. The length of each reflective module, along the longitudinal axis, may also be any length desired. It is envisioned that a reflector surface a mile square could be utilized in a staged solar energy collection system used to generate sufficient heat for a 100 megawatt power plant.

The height of the stanchions for each reflector module depend upon the radius of curvature of the troughs, as will be more fully explained hereinafter. The radius of curvature of the troughs depend upon the width of each module. The depth depends on the slump factor limitations of the stabilized soil or concrete used to form the primary reflector profile. This will also be more fully explained hereinafter.

An alternate and preferred support structure for high temperature reflector sections according to the instant invention comprises the use of a single rigid assembly for the absorber pipes, and utilizing inlet and outlet manifolds, thereby eliminating the requirement of high pressure and rotary slip-joints, as will be seen hereinafter.

Figure 3:
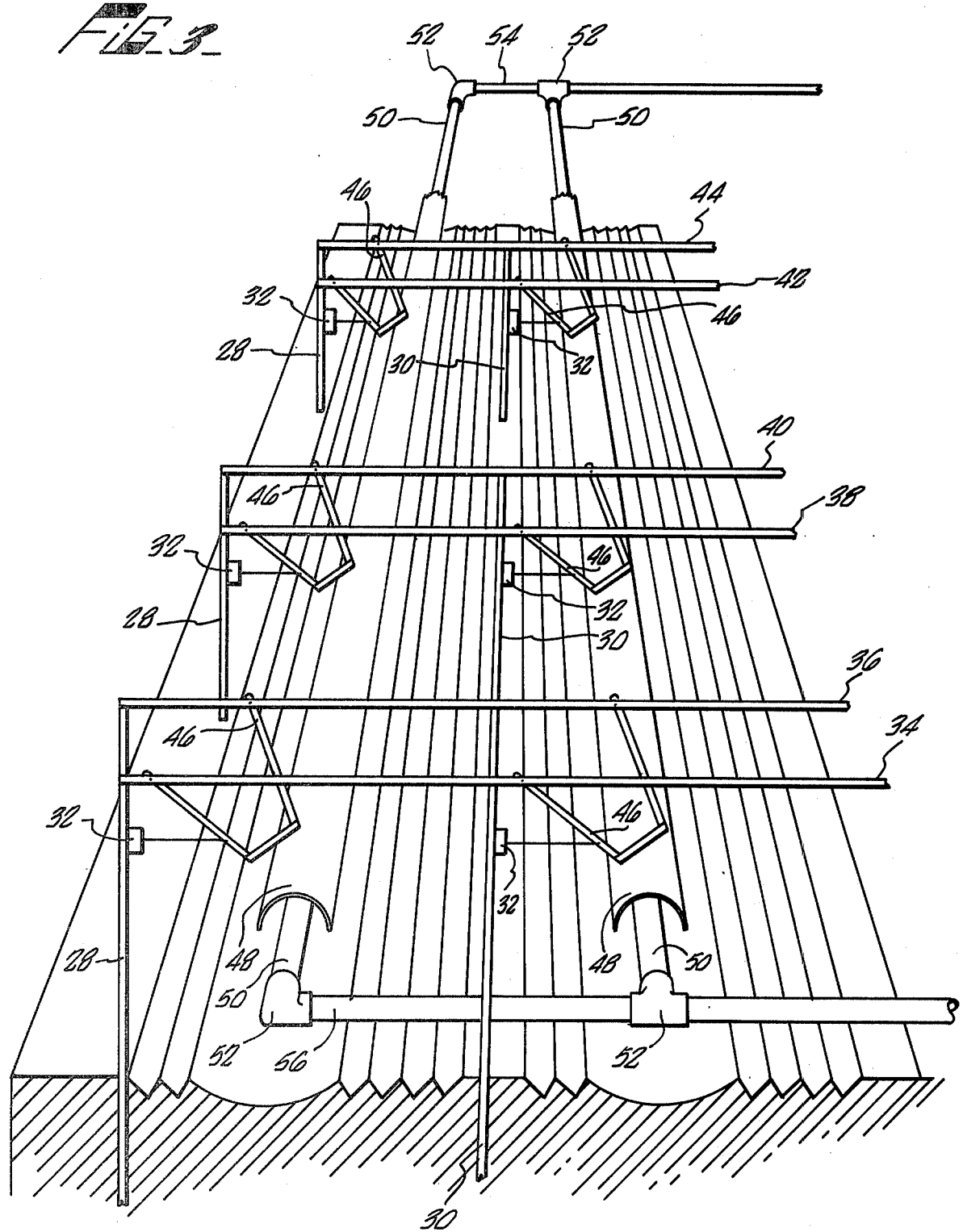
FIG. 3 is a perspective, partial section, illustrating a solar energy collection system according to the present invention.

A variation of the stanchions of the type shown in FIG. 2, is shown in FIG. 3. A plurality of upright support members 28, 30 are provided for each primary reflector module. Each upright support member supports at least a pair of transverse support members 34, 36, 40, 42, and 44. Transverse support members 34, 38, and 42 are located at a first level. Transverse support members 36, 40, and 44 are located at a second higher level.

Four-bar linkages 46 are suspended from the transverse support members at appropriate locations. Each four-bar linkage is moved by actuating devices 32 as described hereinabove. Each four-bar linkage fastens to and supports a secondary reflector mechanism 48 that swings in an arc and pivots about its central axis as the four-bar linkages are moved. Exactly how this is accomplished will be more fully explained hereinafter.

Each secondary reflector mechanism 48 supports an absorber pipe 50 that carries a heat-absorbing fluid. The exact structure of the absorber pipe will be more fully explained hereinafter. Each absorber pipe 50 in each secondary reflector 48 is connected to the other pipes 50 by an inlet manifold 54 and an outlet manifold 56, for supplying a cool heat-absorbing fluid and removing the hot heat-absorbing fluid, respectively. The absorber pipes are connected to the manifolds by high-pressure joints 52, thereby forming a rigid network that moves in unison as the four-bar linkages are caused to move.

It is well known in the art, that a parabolic reflecting trough focuses received parallel light rays, (that arrive in a direction such that a plane perpendicular to the directrix sheet contains the light rays in question,) into a line focus along a line parallel to the vertex line and passing through the axis. If the received light rays, arriving parallel at a parabolic trough, arrive in such a direction that they make an angle with the above-mentioned plane perpendicular to the directrix sheet, the line focus suffers from coma and the focus becomes diffuse. It is for this reason that parablic trough reflectors must be guided so that they always face the incoming sunlight squarely.

It is possible to achieve many of the results of the tracking parabolic trough, with a non-tracking reflecting trough if the cross-section is made to be circular. Cylindrical reflecting surfaces of circular cross section approximate the parallel line focusing action of an optimally-positioned parabolic cylinder, if only small segments of the circular cylinder surfaces are utilized. Incoming parallel light is brought to a substantial line focus for most angles of approach of the sunlight to the circular trough, albeit the location of the line focus varies with the angle of approach of the sunlight.

Figure 4:
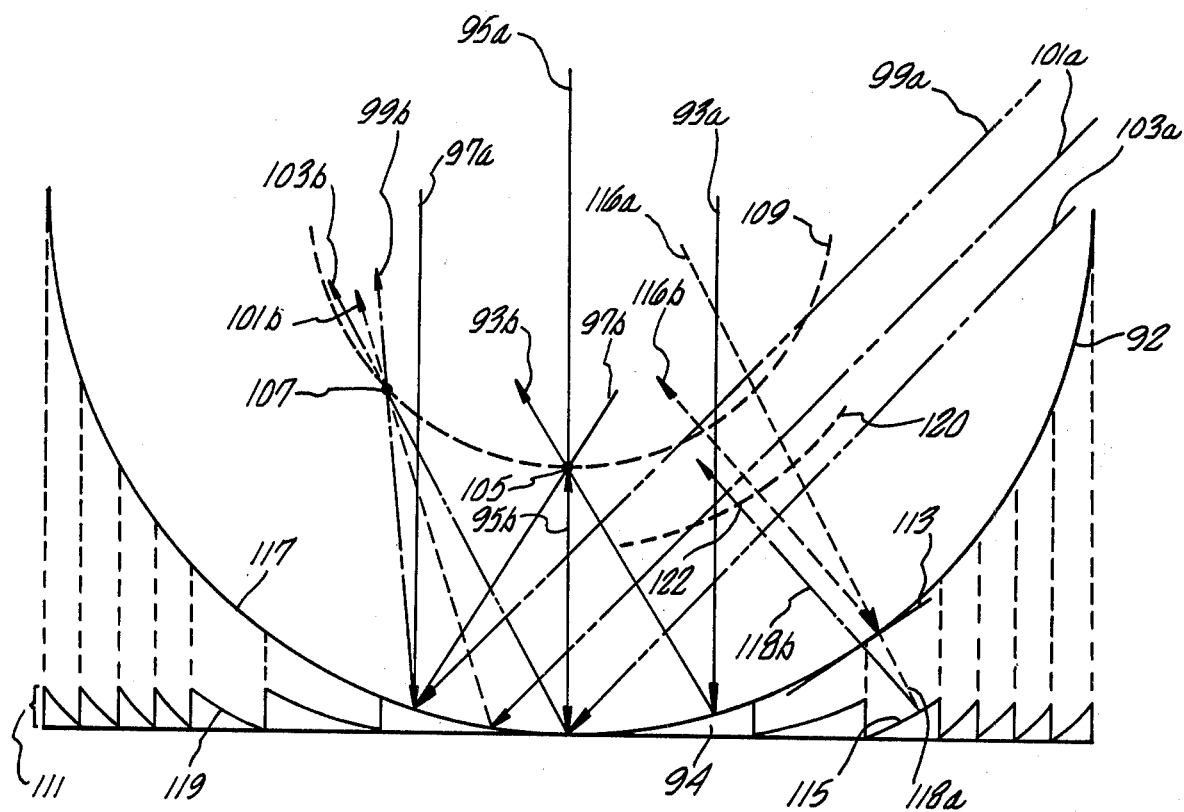
FIG. 4 is a diagrammatic illustration, useful in explaining the principle of the large-scale primary reflector of the present invention.

FIG. 4 illustrates a circular trough 92 receiving a plurality of differently angled parallel light beams. If only a small segment of the circular trough 92 is considered, such as segment 94, for example, parallel light rays 97A, 95A, 93A impinging upon the segment are reflected at the surface of the radius of curvature with an angle of incidence that equals the angle of reflection. As a consequence, rays 93A, 95A and 97A are reflected as rays 93B, 95B and 97B. These rays intersect at a point 105 lying on the focal surface 109. Rays 99A, 101A and 103A of the cylindrical segment 94 are reflected as rays 101B 103B and 99B that intersect at a point 107 on the focal surface 109. Other skewed light rays, such as rays 116A for example would impinge upon the cylindrical surface 92 and be reflected in a direction 116B, and so on. The focal point 105 for parallel lines 95A, 97A, and 93A, and the focal point 107 for parallel lines 101A, 103A and 99A turn into focal lines that run parallel to the longitudinal axis of the cylindrical trough when sheets of light rays parallel to 99A, 101A and 103A but extending into and out of the paper are considered. The focal surface 109 therefore becomes a cylindrical focal trough.

Because a shallow reflecting surface is desired from the standpoint of economy in construction and maintenance, the maximum height 111 to which any reflecting surface may peak should not exceed approximately 12 inches. This problem can be overcome by segmenting the cylindrical surface 92 into a sawtooth-like reflecting surface. Thus, for example, segment 119 is the segment 117 of the cylindrical surface 92 brought down to lie on a common plane with segment 94. Likewise, segment 115 is segment 113 of the cylindrical surface 92 brought down to lie on the same common plane. These segments all have a common height 111.

This segmented reflecting surface, however, will not function to focus parallel lines into a line focus on the surface of focal trough 109. Although the radius of curvature of the various segments are the same as the radius of curvature of the cylindrical trough 92, the distance from the center of curvature of the cylindrical trough 92 varies for each segment. As a consequence, ray 116A, for example, will be reflected from surface segment 115 along reflected light beam 118B. Light beam 116A travels an extra distance 118A before it strikes a reflecting surface 115. The focal point for all parallel light rays striking reflective surface 115 will lie at point 122 which is on a different focal surface of curvature 120 than the focal surface 109 of cylindrical surface 92. Each segmented radius of curvature such as 119 for example may well have a different focal surface.

Figure 5:
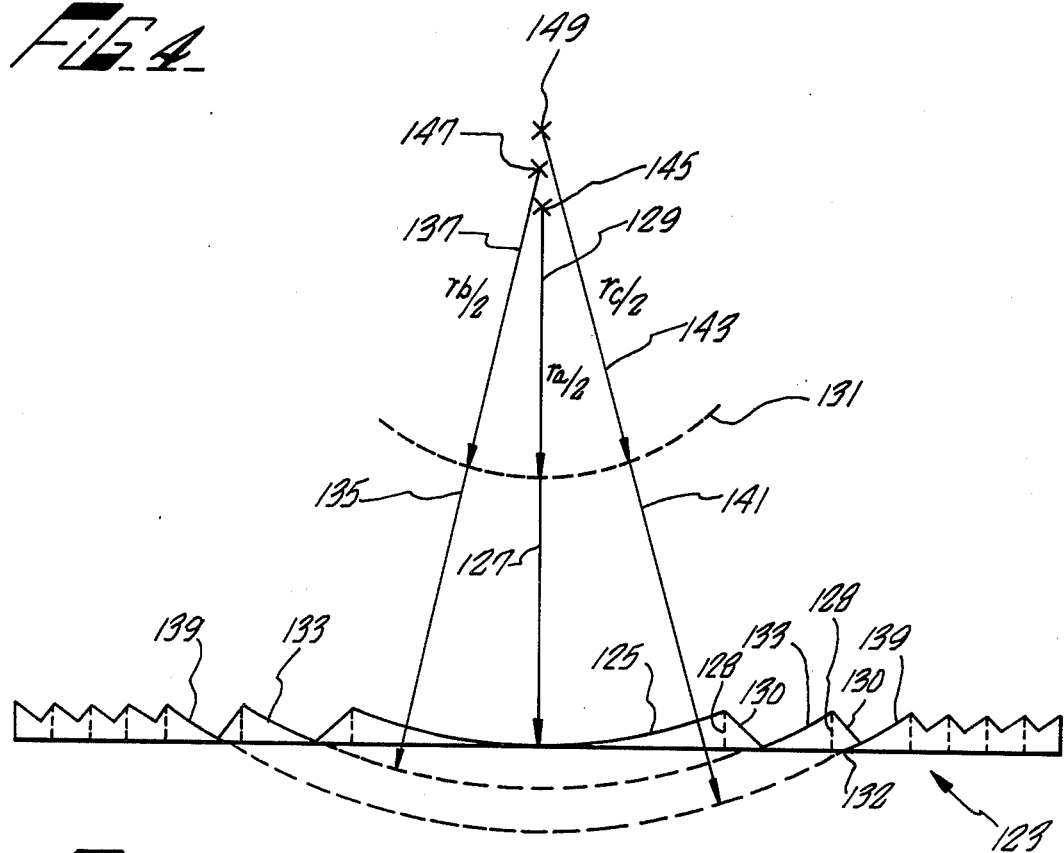
FIG. 5 is a diagrammatic illustration, useful in explaining the desired structure of the large-scale primary reflector of the present invention.

In order to provide a segmented one-dimensional linear reflecting element that is within the range of 4 to 12 inches in height, the radius of curvature of the various segments must be chosen so that no matter which segment of the equivalent flattened reflective surface 119, 94 and 115, for example, is impinged upon by parallel light rays, these light rays will intersect in the surface of a common focal surface. FIG. 5 illustrates how the radii of curvatures for the various segments of the reflector 123 are determined. The largest segment 125 of the reflecting profile 123 is chosen to have a radius of curvature ($r_a$) 127 that, for example, is 10 to 20 feet, this distance being a practical distance for the height of the stanchions. Conceivably, higher stanchions may be utilized. However, the cost of stanchions higher than 20 feet goes up considerably.

Having determined the radius of curvature for the main segment from the cylindrical center of curvature 145 to be approximately 20 feet, the focal surface 131 is located 10 feet, from the surface of segment 125. This focal surface distance is equal to half the radius of curvature ($\frac{1}{2}$)$r_a$. The radii of curvature of the other segments such as 133 and 139, for example, must then be chosen so that the distance from each surface to the chosen focal surface 131 is equal to half of its radius of curvature. Segments 133, as shown in FIG. 5 can be seen as having a radius of curvature 135, termed $r_b$ extending from a center of curvature 147.

The location of point 147 is chosen so that the distance from surface 133 to point 147 is twice the distance from surface 133 to the selected focal surface 131. For this reason, the focal surface of segments 133 will be located on a cylinder with its center at point 147 and having a radius ($\frac{1}{2}$)$r_b$. From the geometry, the focal surface of segments 133 will be almost exactly coincident with focal surface 131, the focal surface for segment 125. Therefore, an absorber pipe travelling along focal surface 131 and receiving reflected energy from segment 125, will, at the same location, receive energy reflected from segments 133.

In a similar fashion, segments 139 are given a radius of curvature $r_c$, extending from a point 149. The location of point 149 is chosen so that the distance from segment surface 139 to point 149 is twice the distance from segment surface 139 to the earlier-selected focal surface 131. Therefore, the focal surface of segments 139 will be located on a cylinder having its center at point 149 and a radius of ($\frac{1}{2}$)$r_c$. Thus, the focal surface of segments 139 will be almost exactly coincident with focal surface 131, the focal surface of segments 126.

By choosing the radii of curvature of the various segments in the trough reflecting surface 123 in this manner, a reflecting surface that effectively functions like the deep trough 117 of FIG. 4, but is actually shaped as shown at 123 in FIG. 5, is obtained. The reflector-concentrator cross-sectional profile 123 illustrated in FIG. 5 can be slip-formed according to the process above described. Rather than slip-forming the reflector surface to have straight edges 128, sloping edges 130 at an obtuse angle are formed. The reason for interleaving the segments in this manner is that the area 132 within each valley between the imaginary straight edge 128 and the real sloped edge 130 is not effective as a reflecting surface because of shading by the upper corner of edge 128. As will be more fully explained hereinafter, by choosing the slope of edges 130 carefully, light rays striking those edges can be reflected to the line focus of an adjacent collector.

Figure 6:
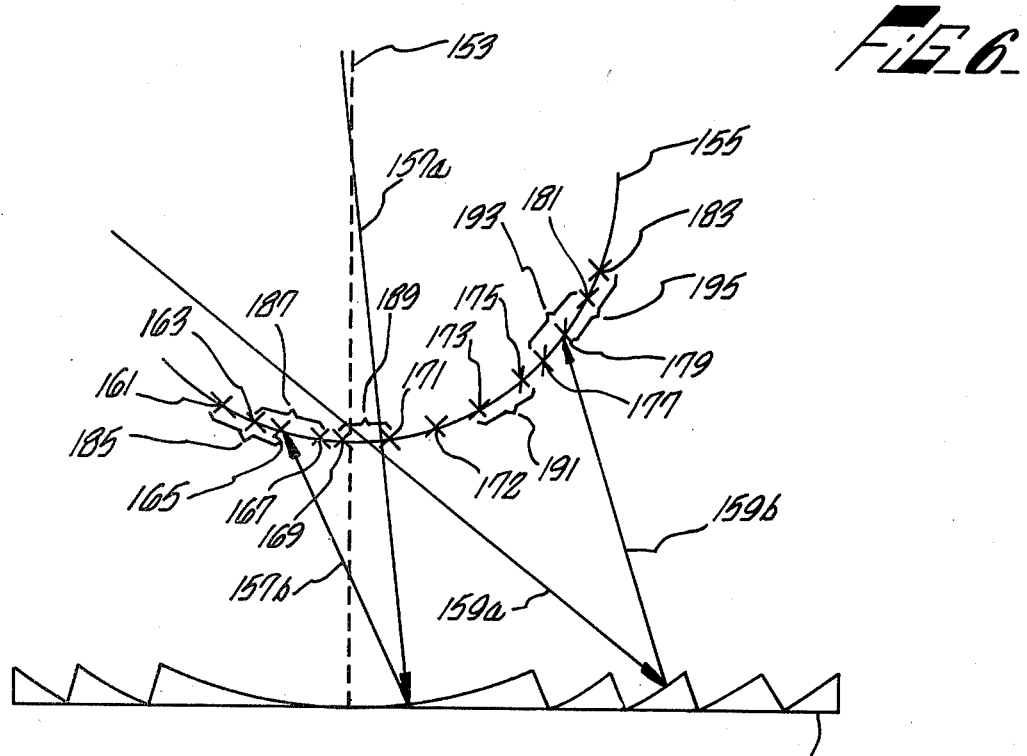
FIG. 6 is a diagrammatic illustration of the daily and seasonal adjustments required by the collector system of the present invention.

The orientation of the longitudinal axis of the segmented trough reflector surface will determine the extent of movement required by the collector pipe along the focal surface, in order to track the movement of the sun diurnally and seasonally. An east-west longitudinal axis orientation is the preferred orientation for the reason that a minimum of collector movement will be required. FIG. 6 illustrates the various positions that the collector must take during various times of the day and throughout the year, in order to be at the focal line of the solar energy reflected from the surface 151, at all times. The various segments of the reflector 151 have radii of curvature that will cause a substantial part of the parallel light impinging on most parts of the reflector surface to be reflected to a common point on arc 155.

The longitudinal axis of the reflecting surface 151 is assumed to be oriented in the east-west direction so that the troughs of the reflecting surface are parallel with the east-west direction. Broken line 153 represents the local vertical axis, shown here for purposes of reference. For an example relating to a location at latitude 34° N, a light ray 157A, at an angle of 11° to the local vertical, depicts the angle of incidence of solar energy impinging upon the refelector surface 151 at about 12 noon on June 21, i.e., the summer solstice. This light is reflected by surface 151 as a light beam 157B, and intersects the focal arc 155 at point 165. As the afternoon wears on, the angle with the local vertical increases, causing the reflected light beam 157B to move toward point 161 on the focal arc 155. At approximately 3:00 P.M., the reflected light rays 157B are intersecting the focal arc 155 at point 161. At 9:00 A.M. that same day, the light rays 157A impinging on surface 151 were reflected to cross the focal arc 155 at the same point 161. Thus, in the morning, these reflected rays will move from point 161 on the focal arc 155 towards point 165, and back toward point 161 in the afternoon.

The light ray 159A depicts the solar energy from a noon time sun on December 21. This energy is reflected by surface 151 as light rays 159B to intersect the focal arc 155 at point 179. At about 3:00 P.M., the reflected rays 159B are intersecting the focal arc 155 at point 183. At 9:00 A.M. of that same day, the rising sun causes the reflected beam 159B to intersect the focal arc 155 at point 183. Thus, the sun's movement causes the reflected rays to start at point 183, gradually move to point 179, at noon, reverse itself and go back to point 183.

Segment 193 of the focal arc 155 depicts the swing of the reflected sun's rays during the month of January. At about 9:00 A.M., the reflected light rays cross the focal arc at point 181. During the morning, they move toward point 177 where they cross at noon time. In the afternoon they move back toward 181 where they cross at 3:00P.M. Segment 191 of focal arc 155 depicts the movement of the reflected sun's rays during the month of February. Intersection 173 is the noon time intersection and intersection 195 being the ±3 hours from noon intersection point. Intersection point 172 of focal arc 155 represents the intersection of the reflected light rays during the month of March. There is minimal movement of the reflected light rays at the equinox date because the sun rises directly in the east and sets directly in the west on this date. The segment 189 of the focal radius 155 represents the movement required during the month of April, intersection point 171 being the noon time intersection point. Intersection point 169 is the ±3 hours from noon intersection point. Segment 187 of focal arc 155 is the movement required during the month of May, intersection point 167 being the noon time intersection point. Intersection point 163 is the ±3 hours from noon intersection point. As already noted, segment 185 of the focal arc 155 is the movement required for the month of June, intersection 165 being the noon intersection point and intersection point 161 being the ±3 hours from noon intersection point.

For the month of July, the reflected sun's rays again move along segment 187 of focal arc 155 as they did in May. In August the reflected sun's rays move along segment 189 of focal arc 155 as they did in April. In September the sun again rises directly in the east and sets directly west as it did in March. In October the reflected sun's rays again traverse segment 191 of focal arc 155 as it did in February. In November the reflected sun's rays again traverse segment 193 of focal arc 155 as it did in January.

In order to track the sun's movements diurnally and seasonally, the collector must traverse the focal arc 155 as the sun moves in the sky. As can be seen from FIG. 5, however, the movement of the collector during each day is quite small. Thus, for example, during December the collector need only move within segment 185. At the equinox dates of March and September, however, the collector pipe is substantially stationary at point 172. By not requiring large transversal movements on a daily basis, the drive mechanism for moving the collector pipe along the focal arc 155 is considerably simplified.

FIG. 7 illustrates one embodiment for suspending the high pressure steel, heat-absorbing, fluid-bearing collector pipes that are moved to always be at the focal line of the reflected sun's rays. The pipes 201, 217 preferably carry water or other fluid that is heated by the reflected solar energy from the reflecting surface 199. As was explained earlier, the fluid-bearng pipes 201 and 217 must move along the focal arcs 215, 233, respectively, in order to track the sun's movements.

There exists for every set of distance and size relationships between the modules that make up the solar collector, an obtuse angle for the edges 130 of the segments of the primary reflector 199 that is most effective in reflecting the incident light rays to an adjacent collector. For example, an incident light ray 206A hitting segment surface 132 is reflected as ray 206B to collector 201. Because of the obtuse angle of slope of edge 130, the entire surface 132 of that segment is an effective reflector. Light rays, such as ray 208A incident on edge surface 130 are reflected as rays 208B to the collector 217 for the adjacent module. Likewise collector 201 will receive some light rays reflected from the edge surface 130 of its adjacent module.

One parallel line of stanchions would be required for each transversely movable collector pipe. The heat-absorbing pipe 201 is connected to a vertical intake pipe member 205 and a vertical outlet pipe member 203. Water (preferably treated or distilled in liquid, vapor or steam form) is supplied to vertical pipe member 205 from pipe 209 through a high-pressure slip joint 213. Steam from the vertical pipe member 203 is supplied to pipe 207 through a high-pressure slip joint 211. The assembly consisting of pipes 205, 201, and 203 can be seen to make up a trapeze that pivots at slip joints 213 and 211 to swing in the focal arc 215. In order for the pipe 201 to swing along this focal arc 215 the distance from the slip joints to the pipe must be equal to half the focal radius of the basic segment in the reflector surface 199.

As was illustrated in FIG. 2 another parallel line of stanchions may support another fluid-bearing pipe memer 217 suspended to swing along the focal arc 233. The vertical inlet pipe 219, the vertical 221 and the heat-absorbing pipe 217 again form a trapeze that swings about the slip joints 229 and 231 that connect the inlet pipe 225 and the outlet pipe 227 to the trapeze assembly. The length of the heat-absorbing pipe assembly is determined by the length of each modular section of the primary reflecting surface. The number of heat-absorbing pipes utilized is determined by the number of modules forming the entire primary reflecting surface.

Figure 8:
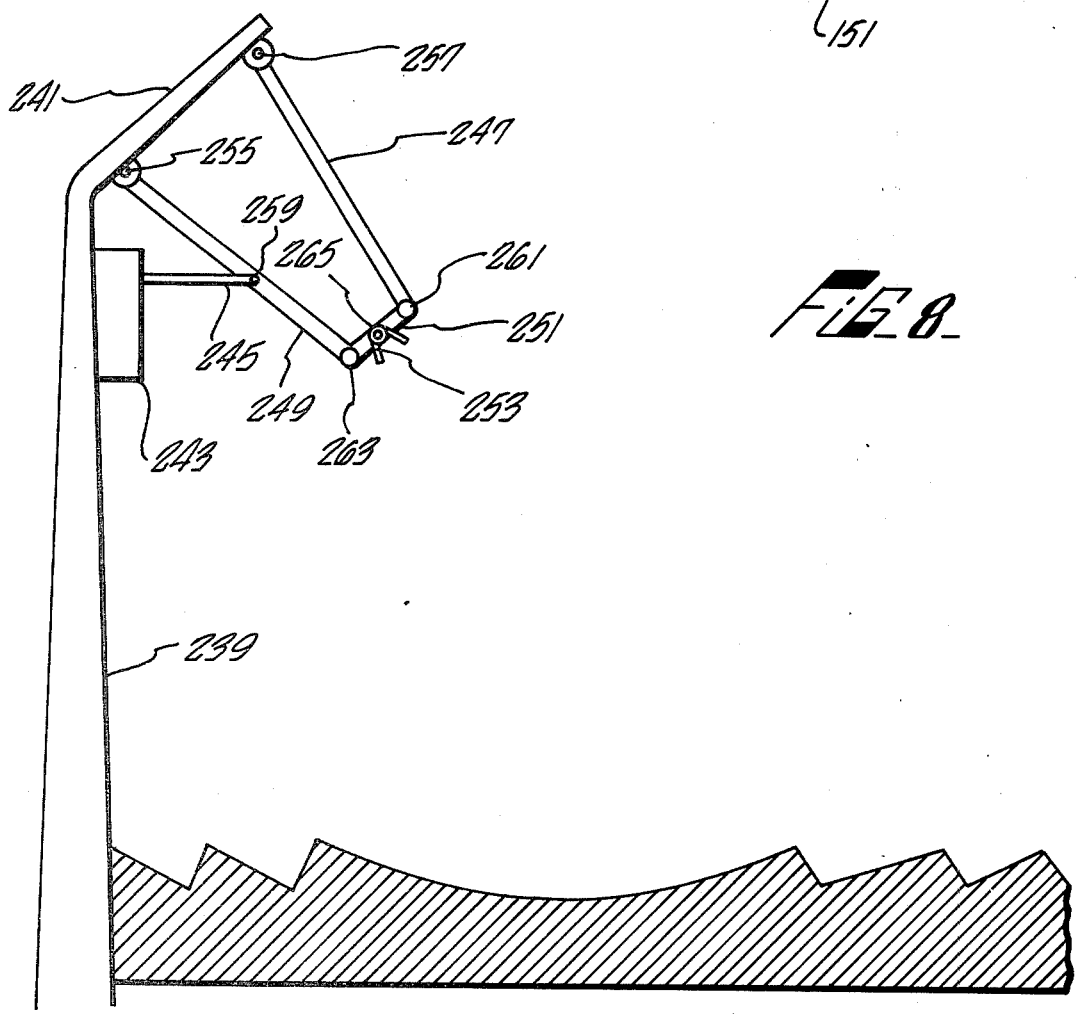
FIG. 8 is a diagrammatic illustration of one type of laterally movable supporting structure for the collectors of the present invention.

The structure for supporting the heat-absorbing pipe assembly of FIG. 7, and transversely moving it along the focal arc is illustrated in FIG. 8. A stanchion having an upright member 239 and a slanting member 241 supports a bar linkage arrangement consisting of linkage 247, 249 and 251. These linkages are connected together by pivot joints 263, 261 and are connected to the stanchion member 241 by pivot joints 257, 255. The heat-absorbing pipe 253 is fastened to the bar linkage 251. A secondary reflector 265 may be placed over the pipe. A hydraulic or electric, or other suitable motive means 243 having a transversely movable arm 245 is pivotally connected at a point 259 on bar linkage member 249. The transverse movement of the arm 245, as directed by motive means 243, causes the entire linkage assembly to shift the heat-absorbing pipe 253 along the focal arc of the primary reflecting surface 237.

FIG. 9 more clearly illustrates the movement of the bar linkage mechanism to cause the collector to swing along the focal arc 275. During the winter months the bar linkage of the trapeze assembly is located in the general area of bar link 269 of focal arc 275. The oscillatory motion of the bar linkage will be within the one segment, as described in connection with FIG. 4. During the equinox months, or March and September, the trapeze assembly, consisting of bar links 249, 247, and 251 are located as shown in solid lines. Very little oscillatory motion is necessary during these months. The secondary reflector 267 is angled to receive the reflected solar energy 273 from the primary reflecting surface 237. During the summer months the bar linkage member of the linkage assembly is located in the general area of link 271 on the radial arc 275. The bar linkage will oscillate along the radial arc 275 within the segments described in connection with FIG. 4. It can be seen that although the swings required of the bar linkage from the winter to summer months is great, the daily swing of this linkage is minimal. Thereby, tracking the daily movement of the sun's image requires minimal movement of the trapeze mechanism. As can be seen this trapeze tracking mechanism is relatively small and therefore allows low cost, low maintenance and minimal windage problems.

The reflecting surface of the present invention is not optically perfect. Even if it were, the environmental condition in which it must operate would detract from its optical reflective characteristics in time. This situation will cause the reflected solar energy to scatter somewhat rather than being reflected as a clear, sharp energy beam. In order to gather in as much of this scattered, reflected energy as possible, a two-dimensional secondary reflector 277 such as illustrated in FIG. 10A is placed around the heat-absorbing collector pipe 275. The secondary reflector 277 is shown as being substantially a U-shaped member having straight or angled legs. The closed end of the U-shaped member of the secondary reflector 277 is form-fitted around the heat-absorbing pipe 275. Any solar energy rays falling within the open mouth of the secondary reflector 277 will be substantially directed towards the pipe 275. The preferred material out of which the secondary reflector 277 is made is aluminium, or any equivalent thereof.

FIG. 10B is a cross-sectional view of an alternate embodiment for the secondary reflector in which the angled legs 282 and 284 of the reflector are curved, rather than being straight. The distance between the angled legs 284 and 282 at the open end 285 of the reflector is preferably twice the diameter of the heat-absorbing pipe at the closed end 283 of the reflector. It is conceived that a collector pipe diameter of four inches would be utilized. Therefore, the distance between the curved leg members 284 and 282 would be eight inches.

In order to retard reradiation and convection heat loss, as a first step for use on the low temperature section, the outside and back of the secondary reflector and the heat-absorbing pipe may be covered with an insulating material, as shown in FIG. 10C. The heat-absorbing pipe 275 carrying the secondary reflector 281 is shown to be completely covered with insulating material 279 that may be magnesia or some other high temperature insulation. The open end and inside of the field collector are left exposed, to receive the reflected solar energy rays.

The system described so far has a relatively high concentration ratio since it is a tracking trough system and can deliver high heat fluxes to the absorber pipe. As the temperature of the fluid in the pipe rises, it progresses from the inlet end toward the outlet end, the protection afforded by the insulating material around the secondary reflector shown in FIG. 10C becomes inadequate. This is so, because radiant heat loss and convective heat loss through the unprotected open end of the secondary reflector becomes unacceptably large for high temperature operation.

Figures 11, 12:
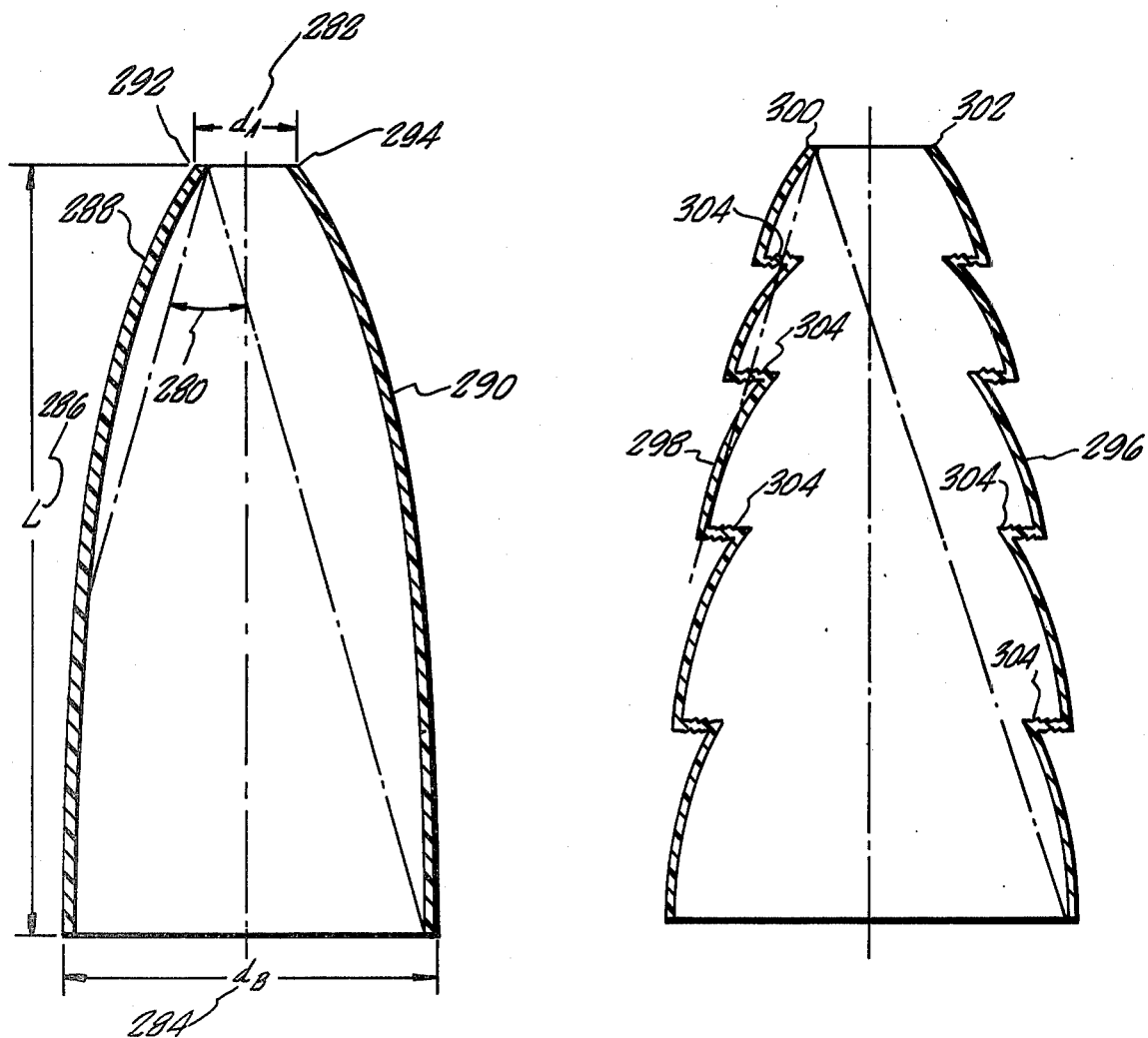
FIG. 11 is a cross-sectional illustration of a two-dimensional secondary reflector.
FIG. 12 is a cross-sectional illustration of a two-dimensional secondary reflector utilizing retroreflector means.

When dealing with higher temperature sections of the absorber pipe, that is those sections of pipe further from the inlet end and closer to the outlet end, a modification of the secondary reflector becomes economically justified, and is shown in FIG. 12. The secondary reflector of FIG. 12 is compared with the secondary reflector of FIG. 11 which shows the features from which the secondary reflector of FIG. 12 evolved.

FIG. 11, shows a more detailed version of a sophisticated curved-side secondary reflector than that shown in FIGS. 10B and 10C. This secondary reflector functions to focus light entering its mouth 284 having a size $d_B$ within its acceptance angle 280 onto the $d_A$ length 282 of the collector. This two-dimensional reflector is made up of two parabolically curved sides 288 and 290, chosen so their respective focal points 294 and 292 fall on the corner of the opposite parabolic side.

The relationship of the distance $d_B$ across the mouth 284 to the distance $d_A$ at the collector 282 is $$d_B = d_A \sqrt{2}$$

for the chosen angular acceptance of 45°.

Thus, if the distance $d_A$ is chosen to be approximately four inches, the diameter of the collector pipe, the distance $d_B$ across the mouth would be approximately 5.6 inches. The relationship between the two distances $d_B$ and $d_A$ and the L length 286 of the two-dimensional reflector is:

$$L = \tfrac{1}{2}(d_B + d_A) \cot 45°$$

For $d_B = 5.6$ inches and $d_A = 4$ inches, L is approximately 4.8 inches.

The secondary reflector of FIGS. 10 and 11 accept solar energy through their whole acceptance angle, and also allow the absorber pipe to emit energy in the form of infrared rays through the same acceptance angle.

In order to decrease the radiation of heat from the absorber pipe body a two-dimensional secondary reflector of the type illustrated in FIG. 12 may be used. This constitutes an improvement. This additional complexity is justified for those sections of the absorber pipe where the fluid therein is at a relatively high temperature so that an appreciable amount of infrared energy will be radiated away if the simple secondary reflector of FIG. 11 were used. The secondary reflector of FIG. 12 functions to prevent a significant fraction of the re-emitted infrared radiation from escaping the reflector. The trapped infrared radiation is returned to the absorber pipe by the shelves 304.

The overall curvature of the two sides 296 and 298 of the secondary reflector of FIG. 12 follow the parabolic curvatures 290, 288 of the secondary reflector shown in FIG. 11. The focal point of parabolic curvature 296 is point 300. The focal point of parabolic curvature 298 is point 302. The shelf-type indentations 304 in the sides 296, 298 of the two-dimensional reflector act to reduce the radiation of heat from the collector. The shelves 304 act as retroreflectors by being covered with retroreflective material such as glass beads or being indented by cube-corner embossing. Any radiation coming from the absorber pipe will have a random directionality with a lambertian distribution. The rays that strike the shelves will be reflected back to the absorber. This reduces the heat loss of the absorber, thereby increasing the overall efficiency.

A tracking solar energy collection system as described above, using line-focusing secondary reflectors of the type shown in FIG. 11 is relatively efficient within a temperature range of 200° F. to 400° F. A tracking system of this type could therefore be used as the line-focus tracking stage 16 in the staged system of FIG. 1.

Figure 13:
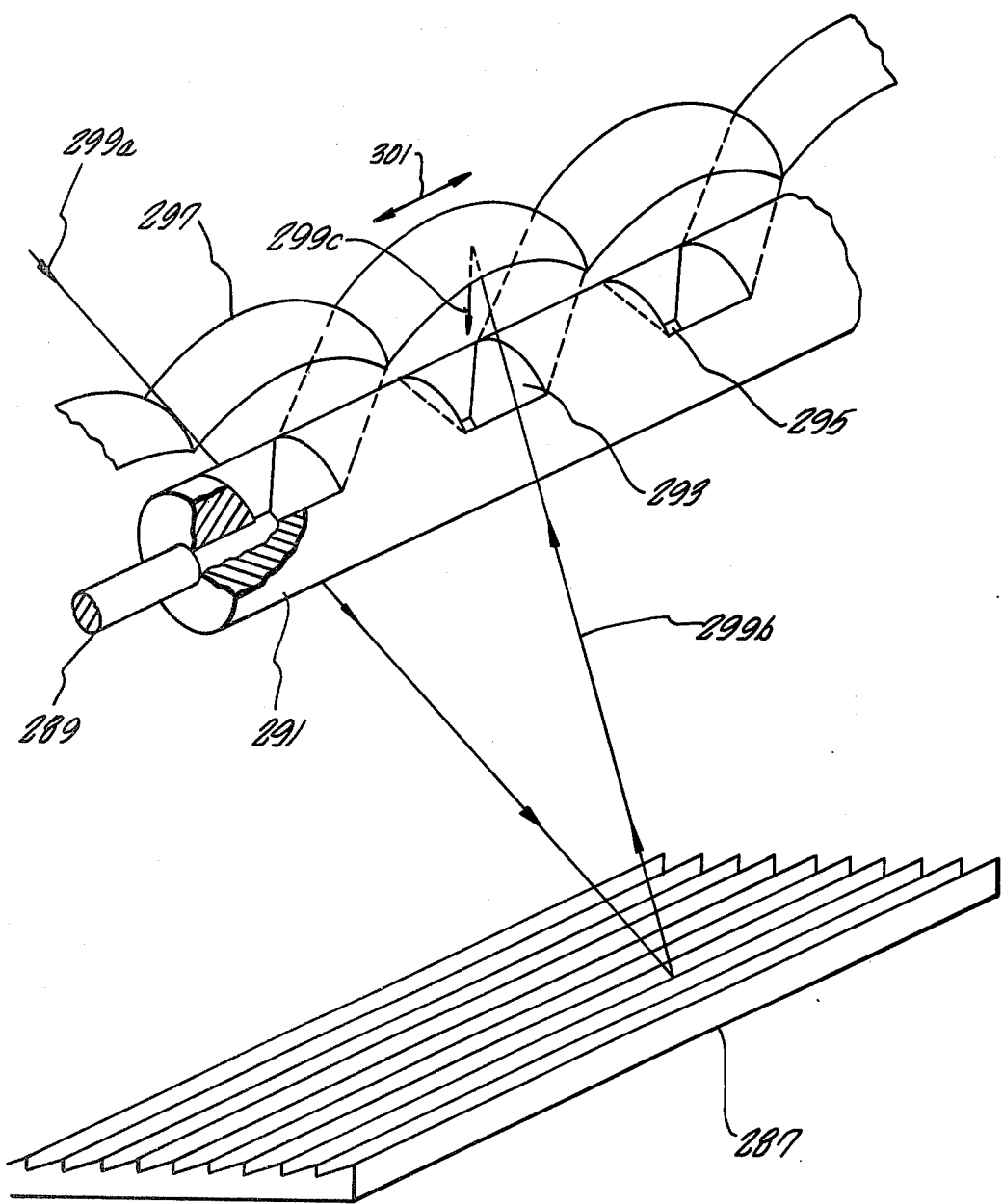
FIG. 13 is a perspective illustration of a refocusing secondary reflector of the present invention.

In order to obtain higher energy concentration ratios for higher temperature results, a refocusing secondary reflector, according to the present invention, must be utilized. A preferred embodiment of a refocusing secondary reflector is illustrated in FIG. 13 as consisting of a plurality of compound curvature reflecting segments 297. Each segment has a parabolic curvature along the direction parallel to the heat-absorbing collector pipe 289 and a circular curvature along a direction perpendicular to the collector pipe 289. An insulating material 291, is placed around the pipe 289. This insulating material may be magnesia or some other suitable high-temperature insulating material. A plurality of recesses 293 having sloping sides that leave a small area 295 of the pipe exposed are formed in the insulating material and spaced to be directly underneath each compound curvature reflecting surface 297. Solar energy rays 299A reflected from the reflector surface 287 as rays 299B, strike the compound curvature reflecting surface 297 and are focused thereby into a spot on the heat-absorbing collector pipe 289. The insulating material around the pipe prevents reradiation and convection losses, except at the relatively small exposed spots at the bottom of the recesses. The concentration of the rays 299B into a spot focus on the collector pipe generates a higher temperature than would be obtainable from a line-focus, and can produce temperatures in the range of 400° F. to 800° F.

The use of the secondary refocusing collector, such as shown in FIG. 13, with the fixed ground-imbedded linear primary reflector of FIG. 2 can be viewed as equivalent to a dish-concentrator, since the image from any given area of the ground-imbedded reflector has diminished in size both longitudinally and transversely in forming a spot.

Alternately, if the system is considered as a trough collector system, all the collected energy enters the absorber pipe, as in any linear-focus system. However, since the absorber pipe is covered with insulation, only a small fraction, for example 1/10 of the total surface area, is available for loss by reradiation. The system then can be considered as equivalent to a linear-focus trough collector system with an absorptivity/emissivity ($\alpha/\epsilon$) ratio of 10, for example. Since this high ratio of effective $\alpha/\epsilon$ is achieved geometrically and not by surface coatings on the pipe, it can be expected to remain constant with time. Appropriate thin film dichroic coating, nickel-oxides or chemical coatings such as calcium fluorides, for example, have a tendency to deteriorate with age. For this reason, it becomes difficult and costly to maintain a high absorptivity/emissivity ratio in conventional linear pipe collecting systems over a substantial period of time using such coatings. As a consequence of the consistently high $\alpha/\epsilon$ ratio obtainable with the secondary refocusing reflector of this invention, this system will provide considerably higher temperatures than conventional trough systems can provide, over an extended time period. The temperatures obtainable will approach those obtainable from a tracking dish reflector.

The compound curvature reflecting surfaces 297, shown in FIG. 13, are preferably made out of a reflecting material such as aluminum which can easily be stamped out in large quantity at a very reasonable cost. Any convenient means may be utilized to movably suspend the reflecting surfaces over the heat-absorbing pipe 289. A motive means (not shown), such as a cam mechanism, is utilized to move the reflecting surface assembly 297 back and forth in the direction indicated by the arrow 301. This movement of the reflecting assembly 297 is required to maintain the spot focus of each reflector within the area of its respective recess as the sun's image changes position during the day.

FIG. 14 illustrates an alternate embodiment of a refocusing secondary reflector. The secondary reflectors 305, 307 for this embodiment consist of bell-shaped members that are suspended from the heat-absorbing collector pipe 301 at their closed end. The collector pipe 301 actually runs through the interior of the bell-shaped members 305, 307 at their closed ends. The bell-shaped members have compound paraboloid curvatures therein that are chosen for the optimal refocusing of solar energy 309 entering their open mouth into a small spot area on the pipe running through their closed end. The depth of the field collectors 305, 307 decrease reradiation and convection heat loss from the exposed pipe 301. These bell-shaped field collectors 305, 307 are spaced as densely as possible along the heat-absorbing pipe 301 to provide a series of high intensity spot focuses of solar energy on the pipe 301. To prevent convection heat loss from the pipe itself, a high temperature insulating material 303 is wrapped around the pipe 301. Due to the generally inverted shape of the bell members, with the open mouth disposed downwardly, the hot spot on the pipe heats the air in the upper closed end of the bell member. As a result, hot air convection currents cannot circulate, thus avoiding another potential loss of heat energy from the pipe. The bell-shaped members thus, not only focus the incoming light rays into a spot but also diminish convection loss, and diminish reradiation loss, which effectively give a high $\alpha/\epsilon$ ratio.

It may be helpful at this point to remember that the reentrant secondary reflectors already described utilized the directionality character of absorbed light (omnidirectional when reradiated) to advantage by structural means. For example, the linear-focusing secondary reflector of FIG. 12 utilized shelves that were retroreflectors to reflect reradiated energy back to the absorber pipe. The spot-image forming refocusing secondary reflector of FIG. 13, likewise can be structured to reduce the amount of reradiated energy leaving the structure. To enhance the reentrant capability of the three-dimensional secondary reflector of FIG. 14 to prevent further radiation of heat, retroreflector shelves may be used therein.

Figure 15:
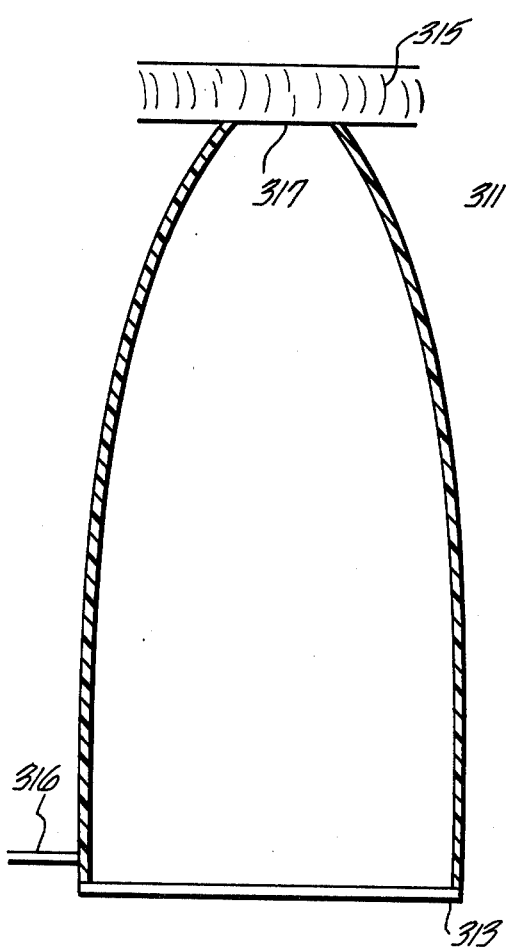
FIG. 15 is a cross-sectional view of an alternate embodiment of a secondary reflector.

In order to enhance the effective $\alpha/\epsilon$ ratio even further, an additional improvement in the system shown in FIG. 14 may be used. This improvement is shown in FIG. 15 and emphasized as items 313 and 317. Item 313 takes advantage of the difference in wavelength of incoming light and infrared radiated energy. This can be accomplished by placing a window of glass over the open mouth of a spot focus-forming secondary reflector such as shown in FIG. 15. The glass will be transparent to light coming in and opaque to the long-wave infrared energy rays radiated from the hot absorber pipe. This will decrease the outflow of energy from the hot absorber pipe, which is equivalent to an increase in the effective $\alpha/\epsilon$ ratio. This is accomplished by geometrical means which is the result of a chosen structural configuration and so is not subject to degradation as are the presently used high $\alpha/\epsilon$ surface coatings. The cover 313, thus provides a greenhouse effect, freely passing incoming visible energy, but not allowing reradiated infrared radiation from the hot absorber pipe 315 to carry energy away.

Item 317 represents the use of a microscopic surface structure on the exposed spots of the absorber pipe 315. This surface structure is analogous to anechoic chamber energy trapping structure that is used in radio-frequency anechoic chambers or acoustic anechoic chambers, but of a microscopic surface feature size, consonant with the minute wavelength here involved. FIG. 15 is a cross-section of a focus-forming secondary reflector 311 that is closed at its mouth by a sheet of glass 313 or an equivalent functioning plastic, in selected cases coated with a dichroic surface. Besides returning a large portion of the infrared energy radiated from the exposed spot 317 of the collector 315, the cover 313 provides a closed environment. By purging this environment with a dry, clean gas such as nitrogen through a pipe 316, a nondeteriorating environment for dichroic and anechoic surfaces is created.

Figure 16:
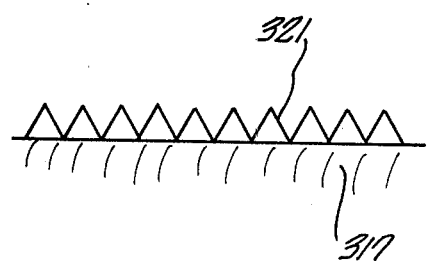
FIG. 16 is a diagrammatic illustration of a surface treatment to be used with the secondary reflector of FIG. 15.
Figure 17:
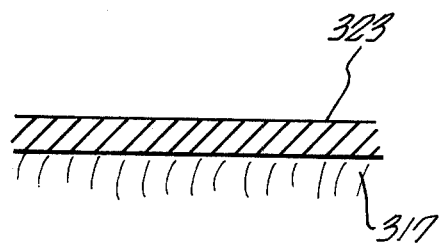
FIG. 17 is a diagrammatic illustration of a surface treatment to be used with the secondary reflector of FIG. 15.

An anechoic surface of titanium, tantalum or tungsten crystal structures 321 are formed on the absorber pipe surface 317 within this protected environment, as shown in FIG. 17. The titanium crystals are formed by, for example, chemical vapor deposition techniques at a thickness of approximately one wavelength of light (0.001 mm). The pyramidal shape of these crystals 321 on the collector surface 317 detailed in FIG. 16 substantially reduces the reradiation of heat energy from the collector 317. The lambertian distribution characteristic of the heat rays leaving the absorber surface 317 is absorbed by the walls of the exposed spicules to a large extent instead of being freely radiated away. An additional advantage is that the surface 321 of FIG. 16 is an efficient absorber for visible light energy so that the factor $\alpha$, the absorptivity of the surface, in the expression $\alpha/\epsilon$ is high compared to conventional absorber pipe surfaces heretofor used in solar collection systems.

An additional step may be taken, when preparing the absorber pipe for use in the higher temperature stages of the collection system. This consists of placing a dichroic layer 323 (FIG. 17) of, for example, calcium fluoride, approximately 0.001 mm in thickness on the absorber pipe 317 to prevent reflections from the absorber pipe surface. This is also effective in causing the heat to be trapped in the absorber pipe.

It should be understood that any combination of the above described means to affect the $\alpha/\epsilon$ ratio may be used, the particular combination chosen depending on cost effectiveness for a particular application, such as the different stages of the seriatim cooperating stages shown in FIG. 1, using different combinations of the above described improvements to make the overall efficiency for the entire system the highest value.

In order to provide a solar energy collection system that is capable of generating high temperature energy during periods when the sun's rays are not strongly evident, such as at night or on overcast days, the solar energy collection system is supplemented with a chemical energy storage system. As will be more fully explained hereinafter, the chemical energy storage system may be utilized to not only supply needed energy when the sun's energy is of insufficient strength, but may also be used to enhance the heating capacity of the solar energy system during periods when the sun's energy is being collected. This type of 24-hour system preferably will utilize the suspension, tracking mechanism and collecting mechanisms generally illustrated in FIG. 3. That is, the network of absorber pipes illustrated are rigidly interconnected and are suspended within their respective secondary reflectors that are in turn suspended by their respective four-bar linkages. The entire network of absorber pipes moves to follow the focal surface defined by the primary reflector, hereinabove described.

Figure 18:
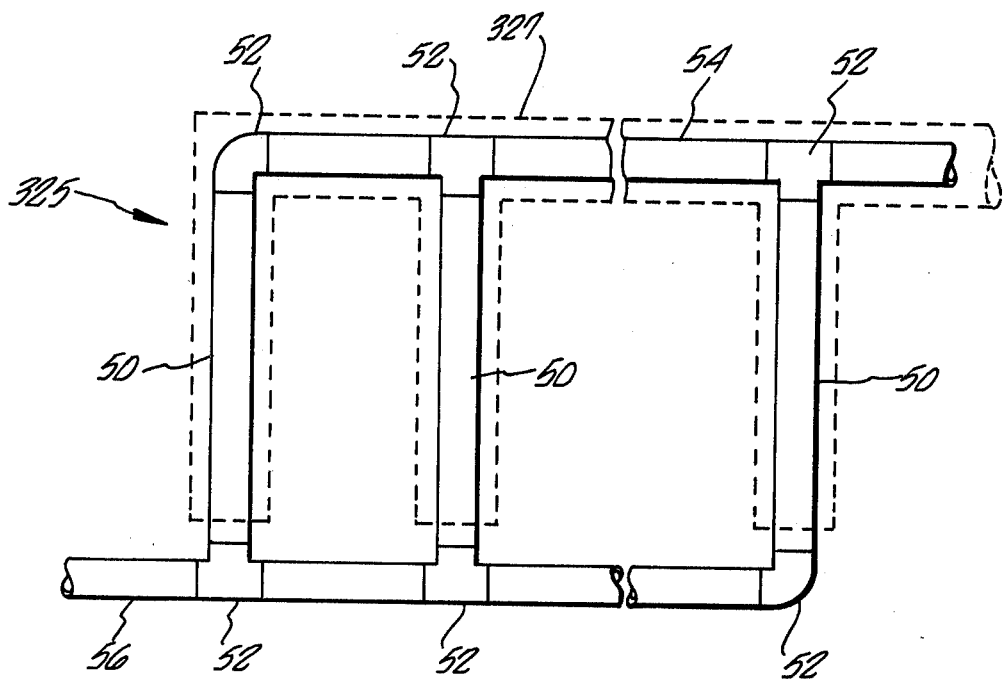
FIG. 18 is a top plan illustration of the piping network used with the solar energy collection system shown of FIG. 3.

The network 325 of absorber pipes is more clearly illustrated in FIG. 18. The network consists of a plurality of absorber pipe sections 50. These absorber pipe sections are the ones that actually receive the solar energy reflected from the primary ground-based reflector of FIG. 3. Each of the absorber pipes 50 is connected to an inlet manifold pipe 56 by way of rigid pipe joints 52 that are capable of withstanding high pressures and temperatures. The other ends of absorber pipes 50 are connected to an outlet manifold pipe 54 by like high pressure, high temperature rigid couplings 52. The manifold pipes, both inlet 56 and outlet 54 are of course connected to a utilization device (not shown) by standard, well-known valving techniques, which include pressurizing and pressure-relief devices, matched to the system operating pressure. Such systems being well within the purview of a person of skill in the art, they are not further disclosed herein.

In operation, water would be supplied to the network 325 through the inlet manifold 56, traverse the lengths of the absorber pipes 50, picking up solar energy therefrom and leave the network by outlet manifold 54. The entire network is preferably covered with high temperature insulation 327. The cool inlet manifold pipe 56 is adapted to provide room for the absorber pipes 50 to expand and contract as a result of thermal variations therein.

Figure 20:
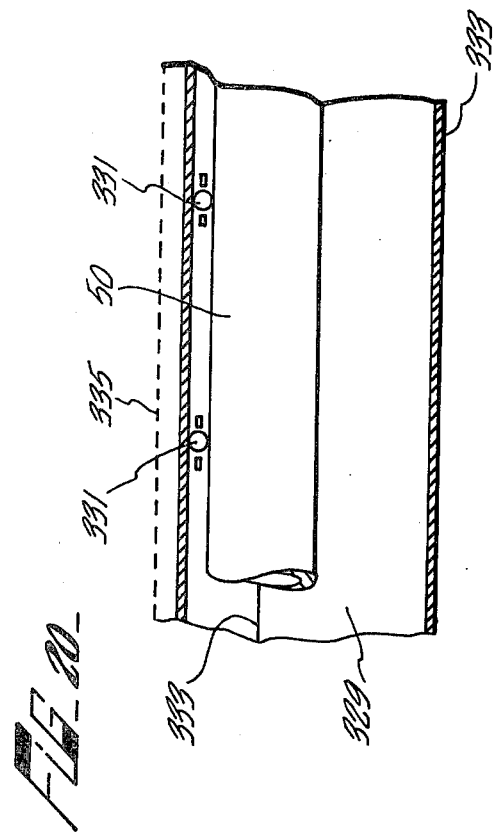
FIG. 20 is front view section, partially broken away of the absorber pipe of FIG. 19.
Figure 22:
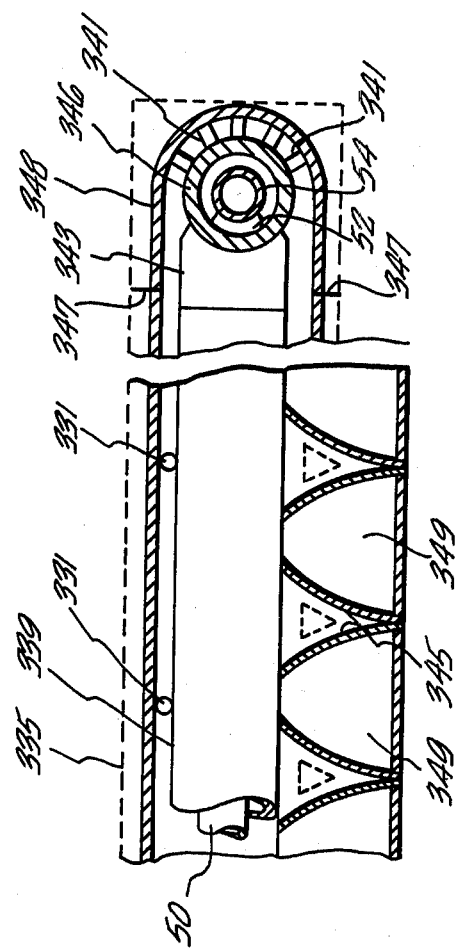
FIG. 22 is a front view section, partially broken away of the absorber pipe of FIG. 21.
Figure 19:
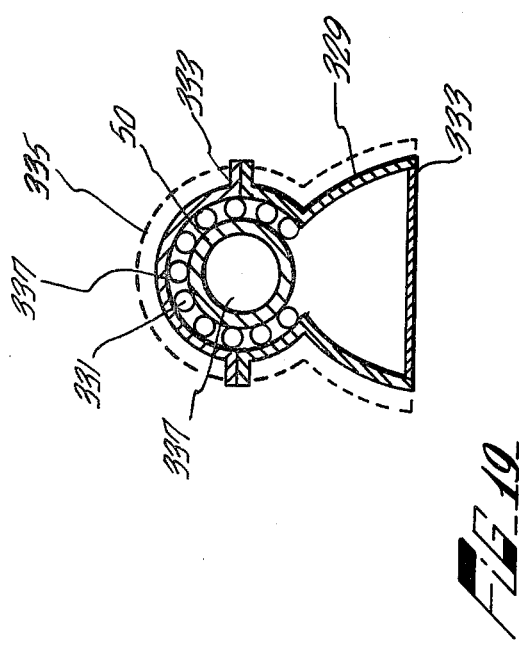
FIG. 19 is an end view section of one embodiment of an absorber pipe used in the network of FIG. 18.
Figure 21:
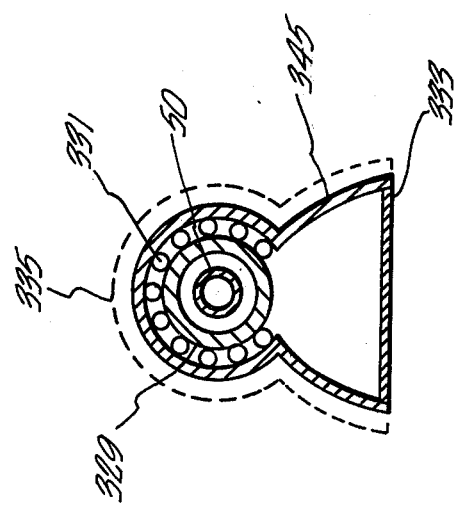
FIG. 21 is an end view section of another embodiment of an absorber pipe used in the network of FIG. 18.

Each absorber pipe 50 is suspended within a secondary reflector which may be a line-image refocusing type, as illustrated in FIGS. 19 and 20, or a spot-image refocusing type, as illustrated in FIGS. 21 and 22. The function and structure of line-imaging and spot-imaging secondary reflectors has been described hereinabove in connection with FIGS. 10, 11, 12, 13, 14 and 15.

FIGS. 19 and 20 illustrate an absorber pipe 50 suspended within a line-imaging secondary reflector 329. The secondary reflector 329 directs off-angle light rays received from the primary reflector to the absorber pipe 50 thereby essentially forming a line focus on absorber pipe 50. The secondary reflector has slightly curved legs and extends the length of the absorber pipe. The interior of the absorber pipe 37 would carry a heat-absorbing fluid such as water. The absorber pipe itself is preferably a high-pressure steel pipe. The secondary reflector 329 rotatably suspends the absorber pipe 50 by way of bearing surfaces 331 located around the pipe 50. The bearing surface may be steel ball bearings nesting in respective bearing retainer rings (like ordinary bearing retainers) 337 in the secondary reflector pipe housing or in a high temperature ball bearing track or any other convenient retaining means capable of withstanding high temperatures. The secondary reflector may be fastened to the absorber pipe 50 by way of bolts through flanges 33 thereby retaining the bottom and top part together against the absorber pipe mechanism 50 by way of the bearing surfaces. A high-temperature insulation, such as steam pipe insulating material 335, preferably surrounds the entire secondary reflector housing 329 except the light ray aperture thereof. The light ray aperture is preferably covered with a transparent window 333, which may conveniently be glass or equivalent. This window as noted hereinabove not only provides a closed environment for the absorber pipe 50, but, to some extent, prevents loss of infrared radiation from the absorber pipe 50.

The spot-image-forming refocusing secondary reflector 345 may similarly be associated with an absorber pipe 50. As noted hereinabove, three-dimensional refocusing secondary reflectors are bell-shaped members that provide a plurality of spot focus points on the absorber pipe 50 rather than a continuous line focus as do two-dimensional reflectors described hereinabove.

In order to provide for temperature boosting of a solar energy collection system and to provide for energy storage that may be utilized during periods of low solar activity, the above-described solar energy collection system may be supplemented with a chemically implemented temperature transformer system. Such a temperature transformer system is described in a copending U.S. patent application, filed Dec. 12, 1974, having title "Low-to-High Temperature Energy Conversion System", by Charles G. Miller and having U.S. Ser. No. 536,786. Briefly, the temperature transformer system, as described in the copending patent application, utilizes a complex chemical to transform a low temperature energy source into a high temperature one. This is accomplished by utilizing a reversible chemical reaction in which an endothermic reaction takes place at the low temperature level and an exothermic reaction takes place at a significantly higher temperature.

As will be more fully explained hereinafter, the three-dimensional tracking stage of a solar collector system as described herein may be utilized to provide the low temperature energy required to produce the endothermic reaction that disassociates the complex chemical into its constituent parts. FIGS. 21 and 22 illustrate the preferred structure for housing the chemical reaction.

The absorber pipe 50 containing a fluid such as water is in turn contained within a high pressure steel pipe 339. The pipe 339 is rotatably suspended by bearing surfaces 331 within the spot-image-forming secondary reflector housing 345. The entire reflector housing is covered by a high temperature insulating material 335, except for the light ray opening thereof which is covered by a transparent window 333 for the purpose, as hereinabove explained, of forming a closed environment and retaining heat within the structure. The atmosphere 349 within the three-dimensional refocusing secondary reflectors 345 may be dry nitrogen.

The hot end of the absorber pipe network, in other words, the outlet manifold 54 is covered with high temperature insulation 335 but is separated from the insulation on the absorber pipe 50 by a slip joint 347. This slip joint prevents the rotary motion of the secondary collectors about the absorber pipe from effecting the non-rotating outlet manifold section 54. The outlet manifold 54 which carries a heat-absorbing fluid is contained within another outlet manifold 346. This outlet manifold is connected to the pipe 339 containing the complex chemical by a high pressure pipe joint 343. The entire structure is contained within the three-dimensional secondary reflector structure 345.

The high temperature outlet manifold 346 is restrained by elements 341 placed between the secondary reflector housing 345 and the outlet manifold 347. This way the hot end of the absorber pipe network is restrained causing the cooler end to exhibit the expansion and contraction that will occur as a result of temperature changes in the network.

Figures 23, 24:
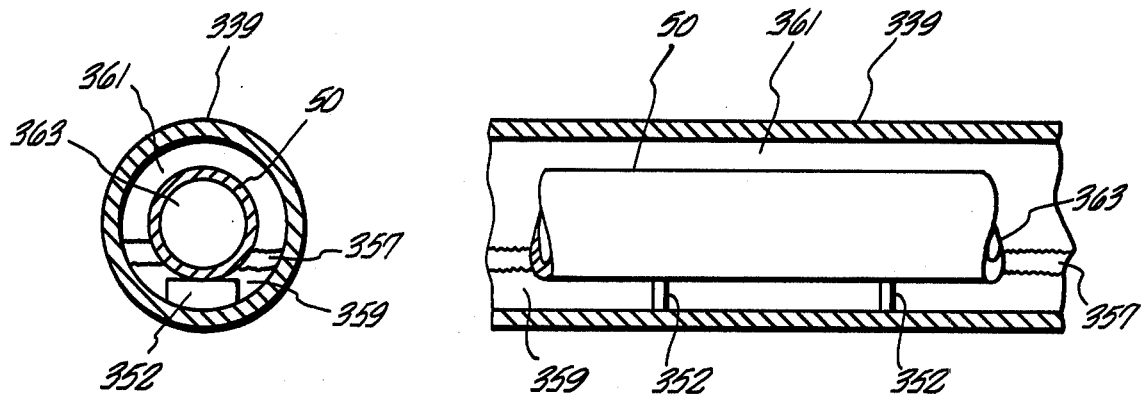
FIG. 23 is an end view partial section of the absorber pipe of FIG. 21 illustrating internal structural detail.
FIG. 24 is a front view section, partially broken away, illustrating the internal structural details of the absorber pipe of FIG. 23.

The fluid carrying absorber pipe 50 is supported within the larger high pressure pipe 339 that forms the reactant chamber for the endothermic and exothermic chemical reactions, more fully described in the above noted copending patent application, by means of a plurality of weirs 352. Assuming that the illustration of FIGS. 23 and 24 represent the endothermic reaction chamber, the constituent parts of the complex chemical such as a metal hydride would be found in the area between the external high pressure pipe 339 and the internal fluid carrying pipe 50.

A plurality of metal hydrides are available which are suitable for this application. However, it should be understood that the complex chemical utilized herein need not be limited to metal hydrides since there are other complex chemicals available such as ammonia which exhibit a reversible endothermic, exothermic reaction cycle. For purposes of convenience, however, the discussion will proceed under the assumption that metal hydrides are being utilized. A Magnesium Hydride ($MgH_2$) is preferred because it disassociates at a pressure of approximately 200 psi and a temperature of 752° F. Other metal hydrides that are also satisfactory can be found in a text titled "The Solid-State Chemistry of Binary Metal Hydrides" by G. G. Libowitz published by W. A. Benjamin Company, 1965. Assuming Magnesium Hydrides were being used in the illustration of FIGS. 23 and 24 and the reaction chamber therein was for the endothermic reaction in which the Magnesium Hydride is disassociated into its constituent elements of Magnesium and Hydrogen, the atmosphere 361 around the pipe 50 would be Hydrogen. The top layer 357 at the bottom of the pipe 339 would be the as yet not disassociated Magnesium Hydride and the bottom layer at the bottom of the pipe 359 would be disassociated Magnesium. The Hydrogen gas 361 can be easily removed by conventional pumping techniques leaving the solids Magnesium and Magnesium Hydride behind.

Figure 25:
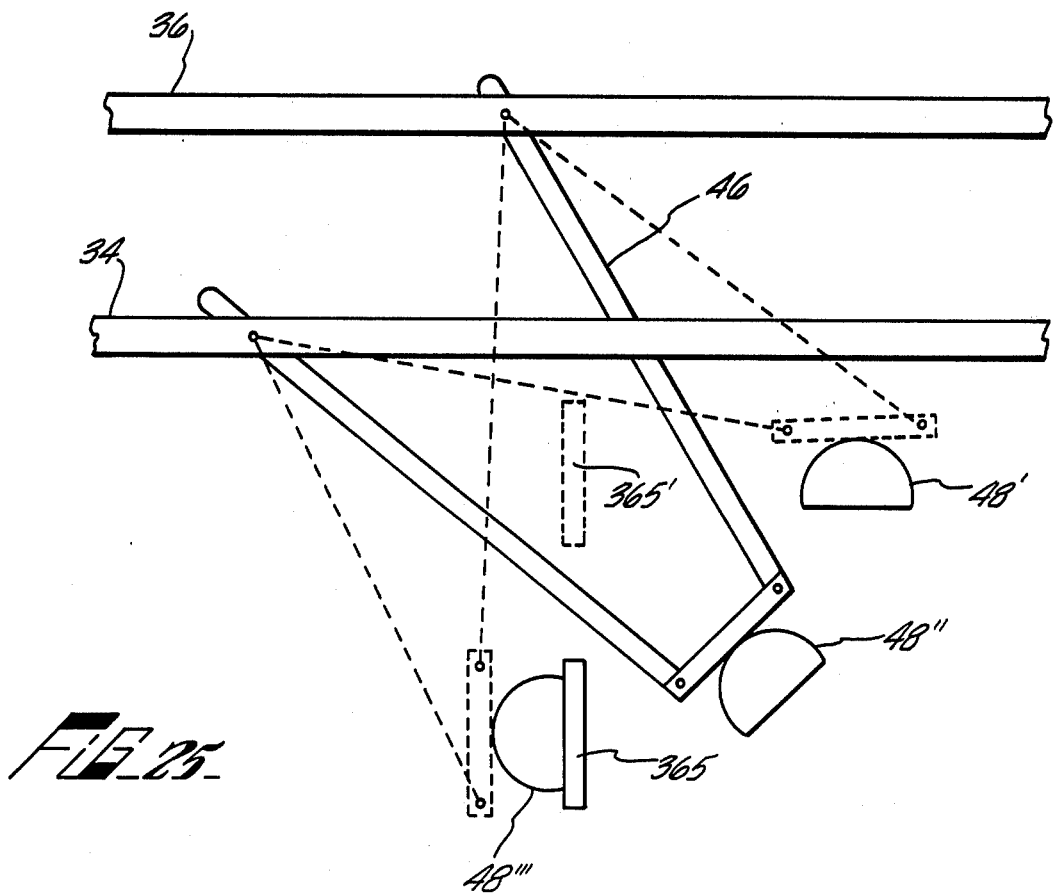
FIG. 25 is a schematic illustration of the laterally movable supporting structure of FIG. 3.

In order to take advantage of the exothermic qualities of the process during periods of low solar activity whereby the exothermic reaction becomes the primary heat source, rather than the solar energy, the entire secondary reflector mechanism would be racked so that the transparent window of the secondary reflector is well insulated. As can be seen from FIG. 25, the secondary reflector mechanism 48 attached to the four-bar linkage 46 rotates about its axis which is perpendicular to the plane of the paper, as the bar linkage 46 tracks the sun's movement, in a manner hereinabove described in connection with FIG. 9. In a period of low solar activity four-bar linkage 46 is moved so that the secondary reflector is located at position 48'''. In this position the transparent window of the secondary reflector 48 may be covered by an insulated mirrored surface 365 that can be conveniently slid into place from a storage position 365'. It should be remembered that the position of the secondary reflector 48''' is assumed only when the solar activity is too low to provide thermal energy to the absorber pipe contained within the secondary reflector, thereby requiring an alternate heat source.

An exemplary illustration of a staged seriatim solar energy collection system utilizing a closed loop endothermic, exothermic chemical reaction process for the purpose of supplying an alternate thermal source or boosting the thermal output of the solar collection system is illustrated in FIG. 26. Water at local ambient temperature is supplied to the system over input line 365 to a solar pond 367, of the type described in the copending U.S. Patent Application noted hereinabove. The output of the solar pond 367 in the form of water having increased thermal energy therein is supplied to a linear-image forming tracking solar energy collection stage 377 through a valve 371 and lines 373. The two-dimensional tracking stage 377 may take the form described hereinabove. The output of this two-dimensional tracking stage in line 379, containing even more thermal energy, is supplied by way of valves and piping to a first spot-image-forming tracking stage 381 of the type illustrated and described herein. The output of this three-dimensional tracking stage on line 383 is supplied to a second three-dimensional tracking stage 391 which may be of similar, if not identical, construction as to the first three-dimensional tracking stage 381 of the system. The output of this, the second three-dimensional tracking stage 391 on line 393 would normally have a temperature at approximatley 100° F. This may be supplied to utilizing equipment by way of the valve 437 and output line 445.

In order to provide the function of thermal boost or alternate thermal source, the first three-dimensional tracking stage 381 and second three-dimensional tracking stage 391 of the solar energy collection system is constructed according to the principles illustrated in FIGS. 3, 14, 15, 16, 17, 18, 21, 22, 23, 24 and 25. In addition a compressor 387, a turbine 401 and a gas storage facility is utilized. The gas constituent of the disassociated complex chemical found in the reaction chamber of the first three-dimensional tracking system 381 and of the second three-dimensional tracking system 391 are removed therefrom at high pressure which is reduced by turbine 401 before being supplied to a gas storage facility 407 for later retrieval. The gas removed from the storage facility 407 is retrieved when additional thermal energy is required. At such time the gas is supplied to either the first three-dimensional tracking stage 381 or the second three-dimensional tracking stage 391 whereupon an exothermic reaction is created generating considerable thermal energy.

Assume now that the system of FIG. 26 is operating in the thermal boost or superheating mode and that the initial condition of the chemical constituents 417 in the first three-dimensional tracking stage 381 is Magnesium Hydride (MgH$_2$) and that the chemical constituent 421 in the second three-dimensional tracking stage is Magnesium. Heated water from the solar pond 367 would be supplied by way of line 369, valve 371 and line 373 to the two-dimensional tracking stage 377. This tracking stage would heat up the water to its peak efficiency temperature and then supply it over line 379 valve 431, line 441 and valve 433 to the first three-dimensional tracking stage 381. While this higher temperature water is being supplied to the first three-dimensional tracking stage 381, thermal energy is being absorbed by the absorber pipe and chemical reaction chamber within this tracking stage at a temperature sufficient to cause disassociation of the Magnesium and Hydrogen, thereby creating a Hydrogen atmosphere 415 and a Magnesium Hydride and Magnesium particulate 417 within the reaction chamber. As the Hydrogen is created by the endothermic reaction, resulting from the elevated temperature, a portion of the Hydrogen is drawn off by way of line 397 and valve 399 to drive turbine 401 which may be used to supply power to compressor 387. The Hydrogen not drawn off from the reaction chamber and the first three-dimensional tracking stage 381 is supplied by way of line 385 to a compressor 387 that compresses the Hydrogen considerably and supplies it over line 389 to the chemical reaction chamber of the second three-dimensional tracking stage 391.

During the time that this is occurring, the water flowing through the first three-dimensional tracking stage 381 is also heated by the solar energy being absorbed and is supplied by way of valve 435 and line 383 to the second three-dimensional tracking stage 391. As it travels through the absorber pipes and the second three-dimensional tracking stage 391, the compressed hydrogen being supplied to the reaction chamber around the absorber pipes causes the Magnesium metal 421 and the compressed Hydrogen atmosphere 419 in the reaction chamber to recombine in an exothermic reaction causing thermal energy to be released which in turn superheats the water flowing within the absorber pipes. This heat superheats the water leaving the second three-dimensional tracking stage 391 on line 393 through valve 437 to output line 445.

It should be observed that the chemical reaction chamber within the three-dimensional tracking stages 381 and 391 are limited in their capacity to hold the reactant materials. For the example of Magnesium Hydride, 2.8 pounds of Magnesium Hydride disassociated is equivalent to the storage of 1 kilowatt hour of thermal energy. Upon the Magnesium Hydride 417 in the first tracking stage 381 being completely disassociated into its constituent part of Magnesium and Hydrogen, only Magnesium will be left in the reaction chamber. The contents of the chemical reaction chamber in the second three-dimensional tracking stage 391, as a result of the exothermic recombining reaction will be the complex chemical Magnesium Hydride. At this point, the valves of the system are actuated to cause water flowing in line 379 to be first directed to the second three-dimensional tracking stage 391 and then to the first three-dimensional tracking stage 381.

Thus, for example, the output flow of stage 377 is routed over line 379 through valve 431 which routes the fluid over lines 439 to valve 437, to line 393 and the second three-dimensional tracking tracking stage 391. As a consequence of solar energy being absorbed by this second three-dimensional tracking stage the Magnesium Hydride therein creating an endothermic reaction that generates Hydrogen and Magnesium. The Hydrogen is drawn off by way of line 425 and valve 423, and supplied to turbine 401. The gas output of the turbine 409 is supplied to the gas storage device 407 by way of line 403 and valve 405. The Hydrogen gas not removed by way of line 425 is supplied over line 389 to compressor 387 that in turn supplies such gas over line 385 at an elevated pressure to the chemical reaction chamber in the first three-dimensional tracking stage 381. In turn, the water from the second three-dimensional tracking stage 391 is supplied over line 383 and valve 435 to the first three-dimensional tracking stage, where, besides absorbing the thermal energy from the solar heat, it absorbs thermal energy from the exothermic reaction occurring thereat. The resultant superheat steam leaves the first three-dimensional tracking stage 381 by way of valve 433 and output line 443 to a desired utilization device.

It can thus be seen that the chemical reaction in which a complex chemical is disassociated and recombined in a closed loop endothermic/exothermic manner as more clearly explained in the copending patent application by Charles G. Miller, having U.S. Ser. No. 536,786, creates a considerable temperature boost to a solar energy collection system. The gas constituents stored in gas storage device 407 which may be of the type used for storing natural gas can be removed over lines 409 by way of valve 411 line 413, valve 426 and lines 429 and 427 to enhance the thermal boost or superheat process.

Assume now for purposes of example that conditions of very low solar activity exist, as would occur during night time. In order to provide thermal energy during such periods, the system would be reconfigured so that the output of the solar pond 367 on line 369 would be routed by way of valve 371 to line 375, the solar pond 367 constructed according to the description in the above noted copending application acts as a thermal storage device and the output of the water on lines 369 therefrom are fairly constant over a long period. The water in line 375 may be supplied either to the first three-dimensional tracking stage 381 or the second three-dimensional tracking stage 391 of the solar collector system by way of valve 435 depending on which stage was being utilized for exothermic recombination reaction. Assuming that the first three-dimensional tracking stage 381 was being utilized because the chemical constituent 417 in the reaction chamber was Magnesium, the Hydrogen gas from the gas storage device 407 would be supplied over lines 429 to the second three-dimensional tracking stage 391 for the purpose of delivering it to compressor 387 over line 389 which would considerably increase the pressure at which the gas is delivered to the reaction chamber over line 385 of the first three-dimensional tracking stage 381. As the water is being delivered to this section 381, the exothermic reaction created as a result of the introduction of high pressure Hydrogen into the reaction chamber would cause recombination of the Magnesium and Hydrogen to form Magnesium Hydride delivering substantial thermal energy to the fluid leaving the stage 381 on line 443. A similar situation would exist for the second three-dimensional tracking stage 391 except that the gas from the storage facility 407 would be delivered by way of valve 426 over lines 427 to the first tracking stage 381 to be compressed by compressor 387 and thereafter supplied to the second tracking stage 391 over line 389. It is conceived that the gas stored in storage facility 407 and the Magnesium contained in one of the reaction chambers would be sufficient to generate high temperature energy for an extended period of time.

In summary what has been described in a large-scale solar power system that is sufficiently efficient, cost effective to be competitively attractive compared to alternative large scale, prime power sources to be used for example to supply large scale utility power generating equipment in the same sense that coal or nuclear generated steam supplies utility power generating equipment.

The solar power system is preferably made up of several stages, each stage operating within its optimum temperature range. As can be seen in FIG. 1 the early stages may be of the higher efficiency, lower working temperature type. For several stages a fixed linear ground-based linear primary reflector is constructed by relatively inexpensive processes utilizing available road-building machinery. The basic tracking system is optimized for particular temperature ranges by use of various secondary reflectors that help to concentrate the light energy on the collector or heat absorber and also substantially reduce the reradiation of infrared energy from the collector. The solar energy collection system is also adapted to provide superheat steam over limited and extended periods of time by utilizing the exothermic reactive properties of such complex chemicals as metal hydrides.

Obviously many modifications and variations of the present invention are possible in light of the above teachings. It is to be understood, therefore, that within the scope of the appended claims the invention may be practiced otherwise than as specifically described.

What is claimed is:

1. A solar energy collecting system, comprising:
   a stationary segmented reflecting surface of a plurality of segments, each segment having a reflecting surface defined by a portion of the surface of curvature of a cylinder having a certain radius of curvature, said segments being interconnected side by side on a common plane;
   means for absorbing heat; and
   means for suspending said heat-absorbing means over said reflecting surface, at a distance equal to one-half the radius of curvature of the cylinder that defines the reflecting surface curvature of each of the segments in the reflecting surface.

2. The solar energy collecting system of claim 1 wherein said heat-absorbing means comprises a fluid-bearing pipe, and said suspending means is operative to shift said pipe to maintain it at the line focus of solar energy reflected from said reflecting surface.

3. The solar energy collecting system of claim 1 wherein said suspending means comprises: a plurality of stanchions linearly aligned with the longitudinal axis of said reflecting surface.

4. The solar energy collecting system of claim 3 wherein said suspending means further comprises:
   a four-bar linkage arrangement supported by said stanchions and supporting said heat-absorbing means.

5. The solar energy collecting system of claim 1 wherein
   the individual segments are formed out of concrete; and
   a light-reflecting sheet material covers said concrete-formed segments.

6. The solar energy collecting system of claim 5 further comprising: vacuum means for holding said reflecting sheet material to the surface of said plurality of cylindrical segments.

7. The solar energy collecting system of claim 6 wherein said vacuum means comprises: a plurality of tubes having orifices therein said tubes being imbedded in said concrete cylindrical segments.

8. A solar energy collecting system, comprising:
a stationary segmented reflecting surface of a plurality of segments, each segment having a reflecting surface defined by a portion of the surface of curvature of a cylinder having a certain radius of curvature, said segments being interconnected side by side on a common plane;
means for absorbing heat;
means for suspending said heat-absorbing means over said reflecting surface at a distance equal to one-half the radius of curvature of the cylinder that defines the reflecting surface curvature of each of the segments in the reflecting surface; and
means for refocusing the solar energy from said reflecting surface into a plurality of spot focus points on said heat-absorbing means.

9. The solar energy collecting system of claim 8 wherein said heat-absorbing means, comprises a fluid-bearing pipe, and said suspending means is operative to shift said pipe to maintain it at the line focus of solar energy reflected from said reflecting surface.

10. The solar energy collecting system of claim 8 wherein said suspending means, comprises: a plurality of stanchions linearly aligned with the longitudinal axis of said reflecting surface.

11. The solar energy collecting system of claim 8 wherein said suspending means further comprises:
a four-bar linkage arrangement supported by said stanchions and supporting said heat-absorbing means.

12. The solar energy collecting system of claim 8 wherein
the individual segments are formed out of concrete; and
a light-reflecting sheet material covers said concrete-formed segments.

13. The solar energy collecting system of claim 12 further comprising: vacuum means for holding said reflecting sheet material to the surface of said plurality of cylindrical segments.

14. The solar energy collecting system of claim 13 wherein said vacuum means comprises: a plurality of tubes having orifices therein said tubes being imbedded in said concrete cylindrical segments.

15. The solar energy collecting system of claim 8, further comprising: insulating material convering said heat-absorbing means, said insulating material having recesses therein that expose small areas of said heat-absorbing means.

16. The solar energy collecting system of claim 15 wherein said heat-absorbing means, comprises: a fluid-bearing pipe.

17. The solar energy collecting system of claim 16 wherein said solar energy refocusing means, comprises: a compound curvature reflector having a parabolic curvature along a direction parallel to said pipe and a circular curvature along a direction perpendicular to said pipe.

18. The solar energy collecting system of claim 17 wherein said compound curvature reflector is movably mounted with respect to said pipe, thereby facilitating the maintenance of the spot focus points within said small exposed areas throughout the day.

19. The solar energy collecting system of claim 16 wherein said solar energy refocusing means, comprises: a compound curvature bell-shaped member suspended from said pipe at each of the small exposed areas on said pipe.

20. The solar energy collecting system of claim 19 wherein said bell-shaped member is pointing downwardly from said pipe.

21. The solar energy collecting system of claim 15 wherein the recesses in said insulating material have sloping sides.

22. A solar energy collection system for producing super-heated water comprising a plurality of solar energy collection stages, each stage adapted to be most efficient within its temperature range,
a first stage means for raising the temperature of water from ambient to a predetermined efficiency limit by solar energy;
a sun-tracking collection system second stage utilizing a fixed linear primary reflector receiving the water from said first stage and raising the temperature of said water; and
a sun-tracking collection system third stage utilizing a fixed linear primary reflector and a spot-image-forming secondary reflector receiving the water from said second stage system and adding heat thereto.

23. The solar energy collection system of claim 22 further comprising a fourth stage including a tracking parabolic dish solar energy collection system.

24. A heat-absorbing collector for use in solar energy collection systems, comprising:
a cylindrical means for absorbing heat;
retroreflecting means for reflecting energy emitted from said heat-absorbing means back to said heat-absorbing means, said retroreflecting means being suspended from said heat-absorbing means and including a plurality of shelves disposed parallel to said heat-absorbing means; and
a reflective means lining said plurality of shelves.

25. The heat-absorbing collector of claim 24 wherein said reflective mean comprises a plurality of small glass beads.

26. The heat-absorbing collector of claim 24 wherein said reflective means, comprises a plurality of cube-corner indentations impressed in said shelves.

27. A solar energy collecting system, comprising:
a stationary sawtooth reflecting surface located at ground level, said surface made up of a plurality of segments, each segment having a reflecting surface defined by a portion of the surface of curvature of a cylinder having a certain radius of curvature, said segments being interconnected side by side on a common plane;
means for absorbing heat;
means for suspending said heat-absorbing means over said reflecting surface at a distance equal to one-half the radius of curvature of the cylinder that defines the reflecting surface curvature of each of the segments in the reflecting surface, said suspending means being operative to shift said heat-absorbing means to maintain it at the line focus of solar energy reflected from said reflecting surface; and
means responsive to the frequency difference between the light rays incident on said heat-absorbing means and the radiation from said heat-absorbing means for reflecting radiation from said heat-absorbing means back to said heat-absorbing means.

28. The solar energy collecting system of claim 27 further comprising means responsive to the random directionality of the radiation from said heat-absorbing means for reflecting said radiation back to said heat-absorbing means.

29. The solar energy collecting system of claim 27 further comprising means responsive to the frequency difference between the light rays incident on said heat-absorbing means and the infrared radiation from said heat-absorbing means for preventing a substantial portion of said radiation from leaving said heat-absorbing means.

30. A solar energy collection system, comprising:
a primary focusing solar energy reflecting surface;
a plurality of fluid-bearing pipes;
a fluid flowing through said pipes for removing heat energy therefrom;
means for suspending said heat energy absorbing means at the focus of said solar reflecting surface;
a secondary reflector supportively and rotatably mounting said fluid-bearing pipes, said secondary reflector including means for focusing solar energy from said primary reflector into a plurality of spot focus points on said fluid-bearing pipes;
a larger diameter pipe containing a section of said fluid-bearing pipes;
a metal hydride contained within said larger diameter pipe outside of said fluid-bearing pipes; and
means for removing from said larger diameter pipe the Hydrogen gas generated upon decomposition of the metal hydride.

31. The solar energy collecting system of claim 30 wherein said primary reflecting surface comprises a stationary segmented trough.

32. The solar energy collecting system of claim 31 wherein said segmented trough reflecting surface comprises a plurality of cylindrical segments interconnected, side by side, on a common plane, each cylindrical segment having a radius of curvature that causes light reflected therefrom to intersect at a common focal surface.

33. The solar energy collecting system of claim 30 wherein said heat-absorbing means further comprises:
an intake manifold rigidly connecting one end of each of said fluid-bearing pipes together; and
an outlet manifold rigidly connecting the other end of each of said fluid-bearing pipes together.

34. The solar energy collecting system of claim 30 wherein said suspending means, comprises:
a plurality of stanchions; and
a four-bar linkage arrangement supported by each of said stanchions and supporting said secondary solar energy reflector.

35. A heat-absorbing collector for use in solar energy collection systems, comprising:
means for absorbing heat;
a thin layer of dichroic material on said heat-absorbing means;
spot focusing means for focusing parallel sun rays into a spot focus on said heat-absorbing means of said spot focusing means, including an enclosure with a single opening for the sun rays to enter;
a transparent window covering said opening and sealing the interior of the enclosure; and
the enclosure containing an inert gas.

36. A heat-absorbing collector for use in solar energy collecting systems, comprising:
means for absorbing heat;
a thin layer of anechoic material on said heat-absorbing means;
spot focusing means for focusing parallel sun rays into a spot focus on said heat-absorbing means of said spot focusing means, including an enclosure with a single opening for the sun rays to enter;
a transparent window covering said opening and sealing the interior of the enclosure; and
the enclosure containing an inert gas.

37. A solar energy collection system, comprising:
a primary focusing solar energy reflecting surface;
a plurality of fluid-bearing pipes;
a fluid flowing through said pipes for removing heat energy therefrom;
means for suspending said heat energy absorbing means at the focus of said solar reflecting surface;
a secondary reflector supportively and rotatably mounting said fluid-bearing pipes, said secondary reflector including means for focusing solar energy from said primary reflector into a plurality of spot focus points on said fluid-bearing pipes;
a larger diameter pipe containing a section of said fluid-bearing pipes;
a metal contained within said larger diameter pipe outside of said fluid-bearing pipe; and
means for inserting Hydrogen gas into said larger diameter pipe containing said metal.

* * * * *